(12) United States Patent
Yatabe et al.

(10) Patent No.: US 10,867,567 B2
(45) Date of Patent: Dec. 15, 2020

(54) LIQUID CRYSTAL DEVICE, LIQUID CRYSTAL DEVICE DRIVING METHOD, AND ELECTRONIC APPARATUS

(71) Applicant: SEIKO EPSON CORPORATION, Tokyo (JP)

(72) Inventors: Satoshi Yatabe, Shiojiri (JP); Naoki Tomikawa, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 76 days.

(21) Appl. No.: 16/413,669

(22) Filed: May 16, 2019

(65) Prior Publication Data
US 2019/0355319 A1 Nov. 21, 2019

(30) Foreign Application Priority Data
May 17, 2018 (JP) .................................. 2018-095150

(51) Int. Cl.
*G09G 3/36* (2006.01)
*G02F 1/1343* (2006.01)

(52) U.S. Cl.
CPC ..... *G09G 3/3614* (2013.01); *G02F 1/134309* (2013.01); *G09G 3/3655* (2013.01); *G09G 2310/0243* (2013.01); *G09G 2320/0233* (2013.01); *G09G 2320/046* (2013.01)

(58) Field of Classification Search
CPC .......................... G09G 3/3614; G09G 3/3655
See application file for complete search history.

(56) References Cited

U.S. PATENT DOCUMENTS

| 2012/0307176 A1* | 12/2012 | Tanaka ................. G02F 1/1343 349/61 |
| 2014/0307190 A1* | 10/2014 | Tomikawa ........... G09G 3/3648 349/33 |
| 2014/0368481 A1 | 12/2014 | Tomikawa |
| 2016/0209685 A1 | 7/2016 | Tomikawa et al. |
| 2016/0253973 A1* | 9/2016 | Nishida ................ G09G 3/3614 345/209 |

(Continued)

FOREIGN PATENT DOCUMENTS

| JP | H11-119193 A | 4/1999 |
| JP | 5092375 B2 | 12/2012 |

(Continued)

*Primary Examiner* — William Boddie
*Assistant Examiner* — Andrew B Schnirel
(74) *Attorney, Agent, or Firm* — Oliff PLC

(57) ABSTRACT

A liquid crystal device includes, peripheral electrodes including three electrodes for ion trapping, and a transistor coupled to each of the three electrodes. A common signal (COM signal) that varies between a first potential and a second potential in a first period is applied to a counter electrode. A driving signal that varies between a third potential and a fourth potential is input to the transistor. The driving signal is coupled to or uncoupled from the peripheral electrodes by the transistor in a unit of a duration equal to or less than ½ of the first period. AC signals varying between a positive-polarity potential and a negative-polarity potential, with a potential of the common signal being a reference, in a second period longer than the first period, are applied to the three electrodes of the peripheral electrodes, in a state where phases of the AC signals are shifted mutually.

15 Claims, 16 Drawing Sheets

(56) References Cited

U.S. PATENT DOCUMENTS

| | | | |
|---|---|---|---|
| 2016/0284302 A1 | 9/2016 | Tomikawa et al. | |
| 2016/0314753 A1 | 10/2016 | Tomikawa | |
| 2017/0116936 A1* | 4/2017 | Nishida | G02F 1/1337 |
| 2017/0139289 A1* | 5/2017 | Asozu | G02F 1/133345 |
| 2017/0146871 A1* | 5/2017 | Asozu | G02F 1/1368 |
| 2017/0337864 A1* | 11/2017 | Igeta | G02F 1/136213 |
| 2018/0180950 A1* | 6/2018 | Nakakomi | G09G 3/3648 |
| 2020/0026131 A1* | 1/2020 | Tomikawa | G02F 1/134309 |
| 2020/0027413 A1* | 1/2020 | Tomikawa | G02F 1/134336 |

FOREIGN PATENT DOCUMENTS

| | | |
|---|---|---|
| JP | 2015-001634 A | 1/2015 |
| JP | 2015-111247 A | 6/2015 |
| JP | 2016-133634 A | 7/2016 |
| JP | 2016-170240 A | 9/2016 |

* cited by examiner

LIQUID CRYSTAL DEVICE, LIQUID CRYSTAL DEVICE DRIVING METHOD, AND ELECTRONIC APPARATUS

The present application is based on, and claims priority from JP Application Serial Number 2018-95150, filed May, 17, 2018, the disclosure of which is hereby incorporated by reference herein in its entirety.

BACKGROUND

1. Technical Field

The present disclosure relates to a liquid crystal device, a liquid crystal device driving method, and an electronic apparatus including the liquid crystal device.

2. Related Art

A liquid crystal device includes a liquid crystal layer held between a pair of substrates. When DC voltages having the same polarity are continuously applied to the liquid crystal layer, the liquid crystal material will degrade and, for example, the specific resistance will change, then the liquid crystal layer cannot display properly. Accordingly, as a driving method for such a liquid crystal device, AC driving is used, in which the polarity of the voltage applied to the liquid crystal layer is inverted in a constant period, e.g., one horizontal duration or one field duration.

In such AC driving, when a driving method that oscillates the potential of an AC signal applied to the pixel electrodes with fixing the potential of a counter electrode, disposed to interpose a liquid crystal layer between the counter electrode and the pixel electrodes is used, the driving circuit that generates the AC signal may require a high breakdown voltage. Accordingly, JP-A-11-119193, for example, proposes a common inversion driving method in which the amplitude of the potential of an AC signal applied to the pixel electrodes is reduced by inverting the polarity of the potential of the counter electrode in one horizontal duration or in one field duration, as described above for example.

There are situations where, when light is incident on the liquid crystal layer, a photochemical reaction may arise between the liquid crystal material and an alignment film, for example, producing ionic impurities as products of the reaction. There are also situations where, during the manufacture of a liquid crystal device, ionic impurities present in a sealant, encapsulant or the like may disperse into the liquid crystal layer. If a partial segregation of the ionic impurities is present in the liquid crystal layer areas in a display region, the partial segregation may be recognizable as unevenness in the display. Accordingly, JP-A-2015-1634 proposes a driving method for a liquid crystal device in which a first electrode, a second electrode, and a third electrode are disposed in that order from the display region side, in a peripheral region between the display region and a sealant, and AC signals having the same frequency with shifted phases from each other are applied to the first to third electrodes.

According to the driving method for a liquid crystal device of the above-described JP-A-2015-1634, applying the AC signals having the same frequency with shifted phases from each other results in an electrical field moving from the first electrode, located on the display region side, toward the third electrode, located on the sealant side. Therefore, ionic impurities are swept from the display region toward the outer sides as a result of the electrical field movement, which is said to be capable of ameliorating display unevenness caused by ionic impurities.

With the driving method for a liquid crystal device according to JP-A-2015-1634, AC signals that vary between positive and negative polarities relative to a reference potential, which is the same potential as the potential applied to the counter electrode, are applied to the first to third electrodes with phases shifted from each other, to sweep the ionic impurities from the display region toward the outer sides. However, in JP-A-2015-1634, the potential supplied to the counter electrode is constant, and thus does not change. As such, JP-A-2015-1634 does not disclose applications for a liquid crystal device driven by a common inversion driving method that periodically inverts the polarity of a potential applied to the counter electrode, as per JP-A-11-119193, and furthermore does not disclose issues arising in the case where such an application is implemented.

For example, JP-A-2015-1634 does not disclose how the polarity inversion period of the potential applied to the counter electrode relates to the above-described AC signal period in the case where the driving method for a liquid crystal device according to JP-A-2015-1634 is applied in a liquid crystal device driven by the common inversion driving method described in JP-A-11-119193. Furthermore, the voltage range of the AC signal increases due to the potential of the AC signal changing during the inversion of the reference potential. This results in a problem in that the advantages of employing a common inversion driving method cannot be achieved, such a lower voltage used by the driving circuit, lower costs through reduced power consumption or a lower breakdown voltage in the driving circuit achieved through such a lower voltage, and the like.

SUMMARY

A liquid crystal device according to an aspect of the present disclosure is a liquid crystal device including an electro-optical material held between a pair of substrates opposing mutually with a sealant interposed therebetween, the liquid crystal device including, a pixel electrode disposed in a display region of the liquid crystal device, a common electrode disposed opposing the pixel electrode, a first electrode disposed between the display region and the sealant, a second electrode disposed between the first electrode and the sealant, and a third electrode disposed between the second electrode and the sealant. A common signal varying between a first potential and a second potential, which is lower than the first potential, in a first period is supplied to the common electrode, a first AC signal varying in a second period, which is different from the first period, is supplied to the first electrode, a second AC signal having a phase different from that of the first AC signal is supplied to the second electrode, and a third AC signal having a phase different from those of the first AC signal and the second AC signal is supplied to the third electrode.

In the above-described liquid crystal device, the second period is preferably longer than the first period.

A liquid crystal device according to an aspect of the present disclosure includes, a first substrate in which a plurality of pixel electrodes are arranged in a display region, a second substrate in which a common electrode is disposed, the common electrode being supplied with a potential of a common signal varying between a first potential and a second potential, which is lower than the first potential, in a first period, a liquid crystal layer held between the first substrate and the second substrate opposing mutually with a sealant interposed therebetween, at least three electrodes opposing the common electrode via the liquid crystal layer, the at least three electrodes being disposed between the display region of the first substrate and the sealant at different intervals from the display region, in other words, the at least three electrodes being disposed between the display region of the first substrate and the sealant at different distances from the display region, and a switching element coupled to each of the at least three electrodes. A driving signal varying between a third potential and a fourth potential lower than the third potential is input to the switching element, in a unit of a duration equal to or less than ½ of the first period, and AC signals varying between a positive-polarity potential and a negative-polarity potential, with a potential of the common signal being a reference, in a second period, which is longer than the first period, are applied to the at least three electrodes in a state where the phases of the AC signals are shifted from one another.

A liquid crystal device according to another aspect of the present disclosure includes, a first substrate in which a plurality of pixel electrodes are arranged in a display region, a second substrate in which a common electrode is disposed throughout the display region, the common electrode being supplied with a common signal potential varying between a first potential and a second potential, which is lower than the first potential, in a first period, a liquid crystal layer held between the first substrate and the second substrate opposing mutually with a sealant interposed therebetween, at least three electrodes for ion trapping, the at least three electrodes being disposed at intervals from one another, in other words, the at least three electrodes being disposed at distances from one another, and between the display region of the first substrate and the sealant, a switching element coupled to each of the at least three electrodes, and a holding capacitor coupled between each of the at least three electrodes and a wiring line, to which a potential of the common signal is supplied. A driving signal varying between a third potential and a fourth potential lower than the third potential is input to the switching element, in a unit of a duration equal to or less than ½ of the first period, and AC signals varying between a positive-polarity potential and a negative-polarity potential, with a potential of the common signal being a reference, in a second period, which is longer than the first period, are applied to the at least three electrodes in a state where the phases of the AC signals are shifted from one another.

In the above-described liquid crystal device, the switching element is in a coupled state in all or part of a first duration in which the common signal is at the first potential and the AC signals are at a negative-polarity potential, or a second period in which the common signal is at the second potential and the AC signals are at a positive-polarity potential, the switching element being in an uncoupled state in a duration other than the first duration, when the common signal is in the first duration and the switching element is in a coupled state, the driving signal is at the fourth potential, and when the common signal is in the second duration and the switching element is in the coupled state, the driving signal is at the third potential.

The above-described liquid crystal device preferably, an average of the second periods of the AC signal is preferably an integral multiple (n times) of 6 of the first period of the common signal, and the AC signals applied to the three electrodes repeat a period of n×(6+1) and a period of n×(6−1).

In the above-described liquid crystal device, a frequency of the common signal is preferably from 60 Hz to 240 Hz, and a frequency of the AC signal is preferably from 0.1 mHz to 5 mHz.

In the above-described liquid crystal device, the at least three electrodes are preferably disposed surrounding the display region in the first substrate.

A driving method for a liquid crystal device according to an aspect of the present disclosure is a driving method for a liquid crystal device including an electro-optical material held between a pair of substrates opposing mutually with a sealant interposed therebetween, the liquid crystal device including, a pixel electrode disposed in a display region of the liquid crystal device, a common electrode disposed opposing the pixel electrode, and a first electrode, a second electrode, and a third electrode disposed between the sealant and the display region at different intervals from the display region, in other words, a first electrode, a second electrode, and a third electrode disposed between the sealant and the display region at different distances from the display region. The driving method includes, supplying, to the common electrode, a common signal varying between a first potential and a second potential, which is lower than the first potential, in a first period, supplying, to the first electrode, a first AC signal varying in a second period different from the first period, supplying, to the second electrode, a second AC signal having a phase different from that of the first AC signal, and supplying, to the third electrode, a third AC signal having a phase different from those of the first AC signal and the second AC signal.

In the above-described driving method for a liquid crystal device, the second period is preferably longer than the first period.

A driving method for a liquid crystal device according to an aspect of the present disclosure is a driving method for a liquid crystal device including, a first substrate in which a plurality of pixel electrodes are arranged in a display region, a second substrate in which a common electrode is disposed, the common electrode being supplied with a common signal potential varying between a first potential and a second potential, which is lower than the first potential, in a first period, a liquid crystal layer held between the first substrate and the second substrate opposing mutually with a sealant interposed therebetween, at least three electrodes for ion trapping, the at least three electrodes being disposed at intervals from one another, in other words, the at least three electrodes being disposed at distances from one another, and between the display region of the first substrate and the sealant, and moreover opposing the common electrode via the liquid crystal layer, and a switching element coupled to each of the at least three electrodes. The driving method includes: inputting, to the switching element, a driving signal varying between a third potential and a fourth potential, which is lower than the third potential, in a unit of a duration equal to or less than ½ of the first period, and applying, to the at least three electrodes, AC signals varying between a positive-polarity potential and a negative-polarity potential, with a potential of the common signal being a reference, in a second period, which is longer than the first period, in a state where the phases of the AC signals are shifted from each other.

A driving method for a liquid crystal device according to another aspect of the present disclosure is a driving method for a liquid crystal device including, a first substrate in which a plurality of pixel electrodes are arranged in a display region, a second substrate in which a common electrode is disposed throughout the display region, the common electrode being supplied with a common signal potential varying between a first potential and a second potential, which is lower than the first potential, in a first period, a liquid crystal layer held between the first substrate and the second substrate opposing mutually with a sealant interposed therebetween, at least three electrodes configured for ion trapping, the at least three electrodes being disposed at intervals from one another and between the display region of the first substrate and the sealant, a switching element coupled to each of the at least three electrodes, and a holding capacitor coupled between each of the at least three electrodes and a wiring line to which the common signal potential is supplied. The driving method includes, inputting, to the switching element, a driving signal varying between a third potential and a fourth potential, which is lower than the third potential, in a unit of a duration equal to or less than ½ of the first period, and applying, to the at least three electrodes, AC signals varying between a positive-polarity potential and a negative-polarity potential, with a potential of the common signal being a reference, in a second period which is longer than the first period, in a state where the phases of the AC signals are shifted from one another.

In the above-described driving method for a liquid crystal device, the switching element is preferably in a coupled state in all or part of a first duration in the common signal is at the first potential and the AC signals are at a negative-polarity potential, or a second period in which the common signal is at the second potential and the AC signals are at a positive-polarity potential, the switching element being preferably in an uncoupled state in a duration other than the first duration, and when the common signal is in the first duration and the switching element is in a coupled state, the driving signal is preferably at the fourth potential, and when the common signal is in the second duration and the switching element is in the coupled state, the driving signal is preferably at the third potential.

In the above-described driving method for a liquid crystal device, the liquid crystal device preferably includes three electrodes configured for ion trapping, an average of the second periods of the AC signal is preferably an integral multiple (n times) of 6 of the first period of the common signal, and the AC signals repeating a period of n×(6+1) and a period of n×(6−1) is preferably applied to the three electrodes.

An electronic apparatus according to an aspect of the disclosure includes the above-described liquid crystal device.

DESCRIPTION OF EXEMPLARY EMBODIMENTS

Figure 1:
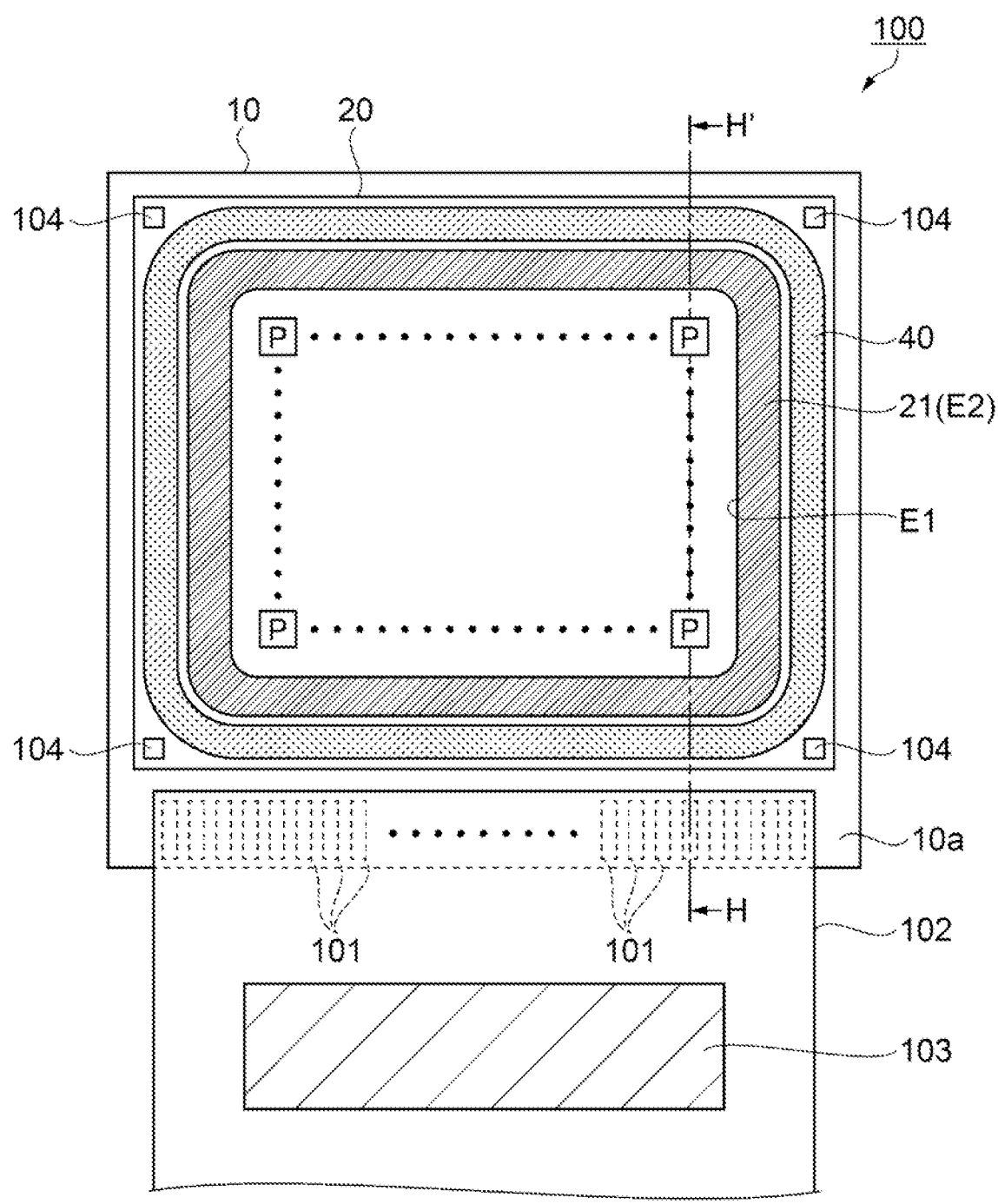
FIG. 1 is a plan view schematically illustrating the configuration of a liquid crystal device according to a first exemplary embodiment.

Exemplary embodiments of the disclosure will be described below with reference to the accompanying drawings. Note that in the drawings referred to below, the parts described are illustrated in an enlarged or reduced state as appropriate so that those parts can be easily recognized.

The present exemplary embodiment will describe an active-matrix type liquid crystal device, which uses thin film transistors (TFTs) as switching elements for pixels, as an example. The liquid crystal device can be used favorably as light modulation means (a light valve) of, for example, a projection-type display device (a projector), which will be described below.

First Exemplary Embodiment

Liquid Crystal Device

Figure 2:
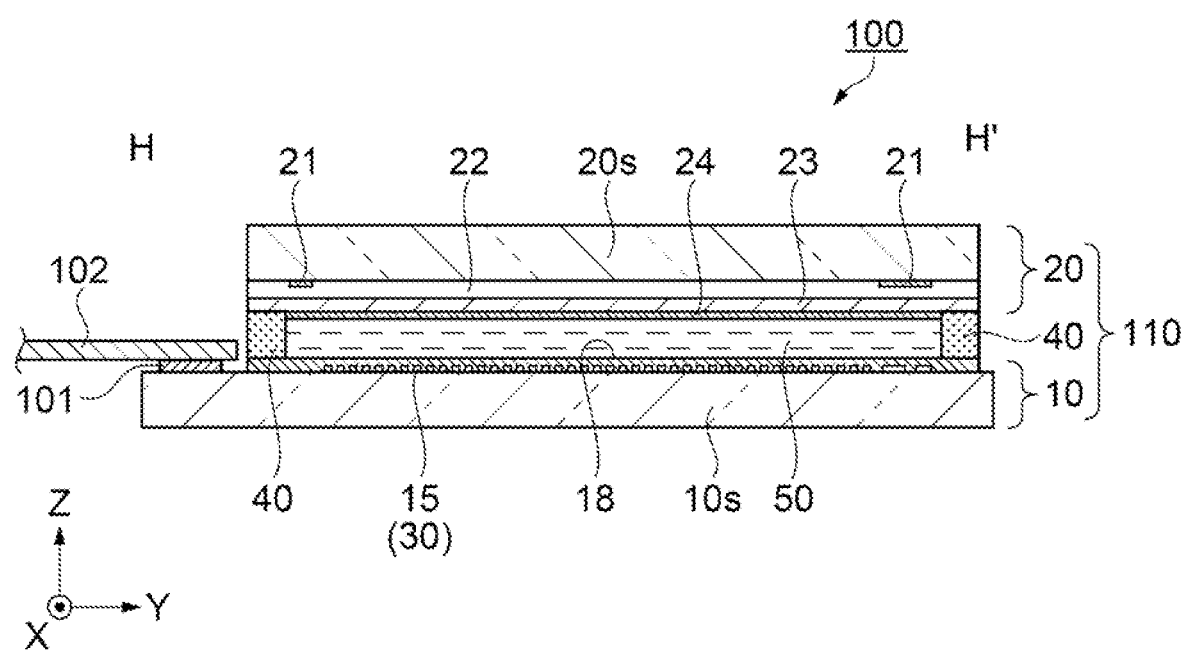
FIG. 2 is a schematic cross-sectional view illustrating the structure of the liquid crystal device, taken along line H-H' in FIG. 1.
Figure 3:
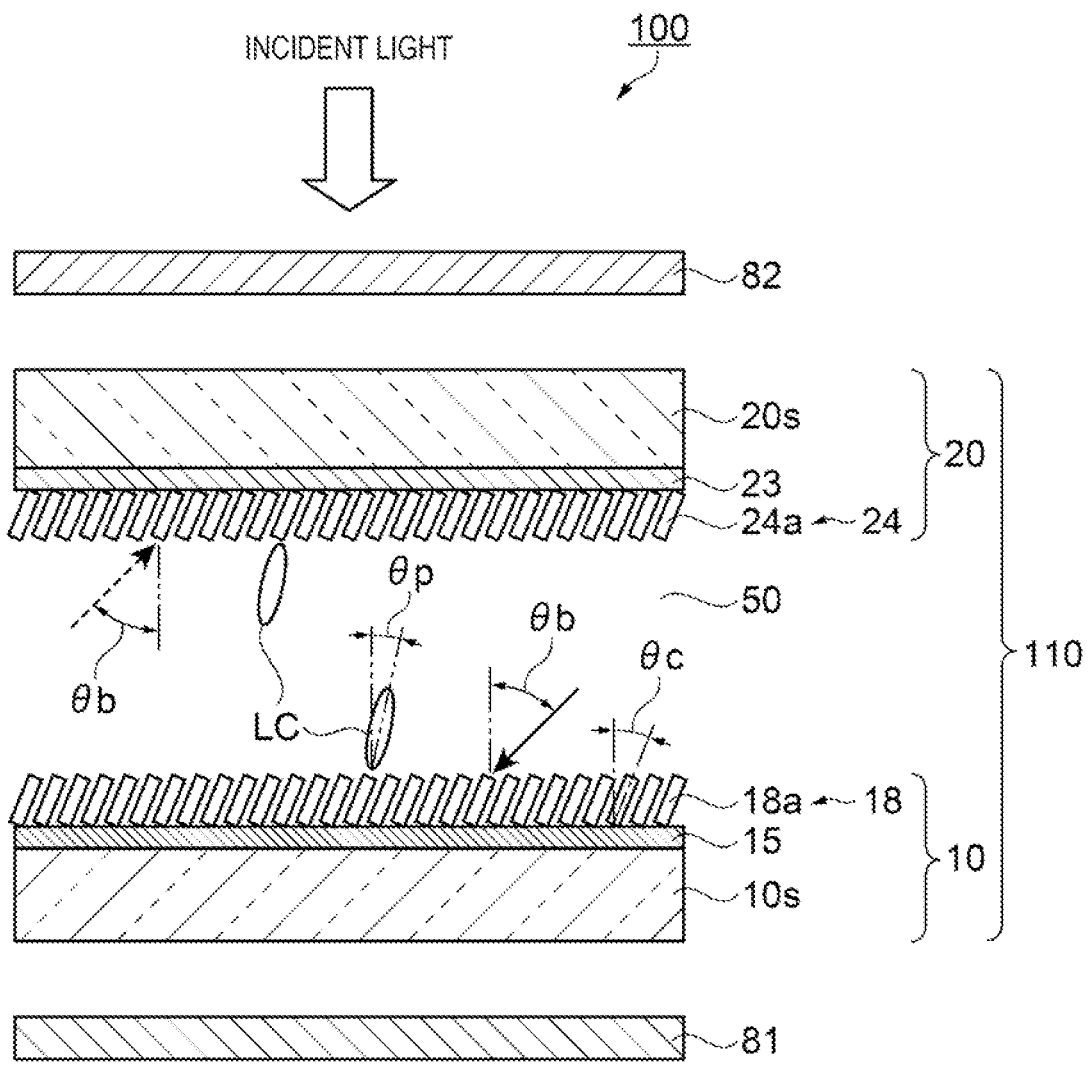
FIG. 3 is a schematic cross-sectional view illustrating an alignment state of liquid crystal molecules in pixels of the liquid crystal device according to the first exemplary embodiment.

First, a liquid crystal device according to this exemplary embodiment will be described with reference to FIGS. 1 to 3. FIG. 1 is a schematic plan view illustrating a configuration of a liquid crystal device according to the first exemplary embodiment. FIG. 2 is a schematic cross-sectional view taken along line H-H' in FIG. 1 and illustrating the structure of the liquid crystal device. FIG. 3 is a schematic cross-sectional view illustrating an alignment state of liquid crystal molecules in pixels of the liquid crystal device according to the first exemplary embodiment.

As illustrated in FIGS. 1 and 2, a liquid crystal device 100 according to the present exemplary embodiment includes an element substrate 10 and a counter substrate 20 disposed to oppose each other, and also includes a liquid crystal layer 50 held between a pair of these substrates. For example, a quartz substrate or a glass substrate having a transparent property is used for each of a base substrate 10s of the element substrate 10 and a base substrate 20s of the counter substrate 20.

The element substrate 10 is larger than the counter substrate 20. These substrates are bonded to each other to be spaced apart from each other by interposing a sealant 40 disposed along the outer edge of the counter substrate 20. A method for forming the liquid crystal layer 50 in a space enclosed by the sealant 40 includes, for example, a one drop fill (ODF) method in which liquid crystal is dropped inside the sealant 40 disposed in a frame shape to bond the element substrate 10 and the counter substrate 20 under reduced pressure.

As the sealant 40, for example, an adhesive such as a thermosetting or ultraviolet curable epoxy resin is employed. The sealant 40 is mixed with a spacer (not illustrated) configured to keep the space between the pair of substrates constant.

A display region E1 in which a plurality of pixels P are arrayed in a matrix shape is provided inside of the sealant 40. In addition, a partition portion 21 is provided in a peripheral region E2 provided between the sealant 40 and the display region E1, to surround the display region E1. The partition portion 21 is made, for example, of a metal or a metallic oxide having a light shielding property. Note that, in addition to the pixels P that contribute to displaying, the display region E1 may include a plurality of dummy pixels.

A portion of the element substrate 10 protruding outwardly from the counter substrate 20 is provided with a terminal portion 10a in which a plurality of external coupling terminals 101 are arrayed. A flexible circuit board (FPC) 102 for making electrical coupling with external driving circuits is mounted on the terminal portion 10a. A driving IC 103 relating to driving of the liquid crystal device 100 is mounted on the FPC 102. The FPC 102 is electrically coupled to the plurality of external coupling terminals 101, for example, by interposing an anisotropic conductive film (ACF).

Hereinafter, the direction X represents a direction in which the external coupling terminals 101 are arrayed in the terminal portion 10a of the element substrate 10, and the direction Y represents a direction perpendicular to the direction X on the same plane. In addition, the direction Z represents a direction perpendicular to the direction X and the direction Y and oriented from the element substrate 10 side toward the counter substrate 20 side. Furthermore, the "in plan view" or "planar manner" means that viewing is performed in a direction opposite to the direction Z, in other words, from the counter substrate 20 side toward the element substrate 10 side. In this exemplary embodiment, pixels P are arranged in the display region E1 in a matrix shape in the direction X and the direction Y.

As illustrated in FIG. 2, on the surface of the element substrate 10 on the liquid crystal layer 50 side, optically transparent pixel electrodes 15 provided for each pixel P, a thin film transistor (hereinafter, referred to as a TFT) 30 serving as a switching element, signal wiring lines, and an alignment film 18 covering these elements are formed. In addition, the device employs a light shielding structure that prevents an unstable switching operation caused by light being incident on the semiconductor layer in the TFT 30. The element substrate 10 is merely an example of a first substrate according to the present disclosure. The element substrate 10 includes the base substrate 10s, and also includes the pixel electrodes 15, the TFT 30, the signal wiring lines, and the alignment film 18, each of which is formed on the base substrate 10s.

The counter substrate 20 disposed to oppose the element substrate 10 is merely an example of a second substrate according to the present disclosure. The counter substrate 20 includes, the base substrate 20s, the partition portion 21 formed on the base substrate 20s, a planarizing layer 22 film formed to cover the partition portion 21, a counter electrode 23 that covers the planarizing layer 22, is provided throughout at least the display region E1, and functions as a common electrode, and an alignment film 24 that covers the counter electrode 23.

The partition portion 21 is provided to surround the display region E1 as illustrated in FIG. 1. This prevents unnecessary stray light from being incident on the display region E1 from the counter substrate 20 side, thereby achieving high contrast in displaying of the display region E1.

The planarizing layer 22 is made, for example, of inorganic material such as silicon oxide, and is provided to have optical transparency and cover the partition portion 21. A method for forming such a planarizing layer 22 includes, for example, a method for film formation using a plasma CVD method.

The counter electrode 23 is made, for example, of a transparent conductive film such as an Indium Tin Oxide (ITO). The counter electrode 23 covers the planarizing layer 22, and is electrically coupled to vertical conducting portions 104 provided on four corners of the counter substrate 20 as illustrated in FIG. 1. The vertical conducting portions 104 are electrically coupled to wiring lines on the element substrate 10 side.

The alignment film 18 covering the pixel electrode 15 and the alignment film 24 covering the counter electrode 23 are selected depending on optical design of the liquid crystal device 100. For example, the alignment films 18 and 24 include an organic alignment film obtained by film forming an organic material such as polyimide into a film, and rubbing the surface thereof to apply a process to cause liquid crystal molecules having positive dielectric anisotropy to be substantially horizontally aligned, and also includes an inorganic alignment film obtained by film forming an inorganic material such as SiOx (silicon oxide) into a film using vapor phase growth method to cause liquid crystal molecules having negative dielectric anisotropy to be substantially vertically aligned.

Such a liquid crystal device 100 is of a transmissive-type, and employs an optical design of a normally white mode in which the transmittance of the pixels P is maximum in a state where voltage is not applied, or of a normally black mode in which the transmittance of the pixels P is minimum in a state where voltage is not applied. A polarizing element is disposed on each of the light incidence side and the light exit side of the liquid crystal panel 110 including the element substrate 10 and the counter substrate 20 in accordance with the optical design to be used.

In the present exemplary embodiment, description will be made of an example in which an inorganic alignment film described as the alignment film 18 and 24, and liquid crystal having negative dielectric anisotropy are used, and an optical design of a normally black mode is employed.

Next, the alignment films 18 and 24 in the pixel P and an alignment state of liquid crystal molecules will be described with reference to FIG. 3. As illustrated in FIG. 3, the alignment film 18 covering the pixel electrodes 15 on the element substrate 10 is a group of columnar bodies 18a made of silicon oxide and obtained, for example, by oblique deposition of silicon oxide. The angle θb formed by the normal line to the base substrate 10s and the film forming direction illustrated with the solid arrow is, for example, 45 degrees. The angle θc formed by the normal line and the direction in which the columnar body 18a grows from the surface of the base substrate 10s is not necessarily the same as the angle θb described above, and is approximately 20 degrees in this case. On the film surface of the alignment film 18, which is an inorganic alignment film as described above, the liquid crystal molecules LC having negative dielectric anisotropy is substantially vertically aligned with pre-tilt such that the longitudinal axis thereof is tilted toward the film forming direction. The pre-tilt angle θp formed by the normal line to the base substrate 10s and the longitudinal axis of the liquid crystal molecules LC is in a range, for example, from 3 degrees to 5 degrees. In other words, the angle θc of the columnar body 18a growing relative to the base substrate 10s, namely, the angle θb at the time of film forming is controlled such that the pre-tilt angle θp of the liquid crystal molecules LC is in the range from 3 degrees to 5 degrees.

Similarly, the alignment film 24 covering the counter electrode 23 on the counter substrate 20 side is a group of columnar bodies 24a made of silicon oxide and obtained, for example, by oblique deposition of silicon oxide. The angle θb formed by the normal line to the base substrate 20s and the film forming direction illustrated with the solid arrow is, for example, 45 degrees. The liquid crystal molecules LC is substantially vertically aligned with respect to the film surface (columnar body 24a) of the alignment film 24, which is an inorganic alignment film, having a state of pre-tilt toward the film forming direction. Note that, in FIG. 3, the columnar bodies 18a and 24a are illustrated to have the same size. However, individual columnar bodies 18a and 24a do not necessarily have the same size or grow in the same direction, and the size or the growing direction varies.

The liquid crystal layer 50 is held between the element substrate 10 including the pixel electrode 15 on which the alignment film 18 is formed and the counter substrate 20 including the counter electrode 23 on which the alignment film 24 is formed. A polarizing element 81 and 82 is disposed on each of the light incidence side and the light exit side of such a liquid crystal panel 110, and is used. Note that the present exemplary embodiment employs a configuration in which light is incident on the liquid crystal panel 110 from the counter substrate 20 side. However, the configuration is not limited to this, and it may be possible to employ a configuration in which light is incident from the element substrate 10 side.

In the liquid crystal device 100, once AC voltage (driving signal) is applied across the pixel electrode 15 and the counter electrode 23 to drive the liquid crystal layer 50, the liquid crystal molecules LC behave (vibrate) to tilt in the direction of electric field occurring between the pixel electrode 15 and the counter electrode 23. In other words, the liquid crystal molecules LC vibrate in the direction of pre-tilt.

Figure 4:
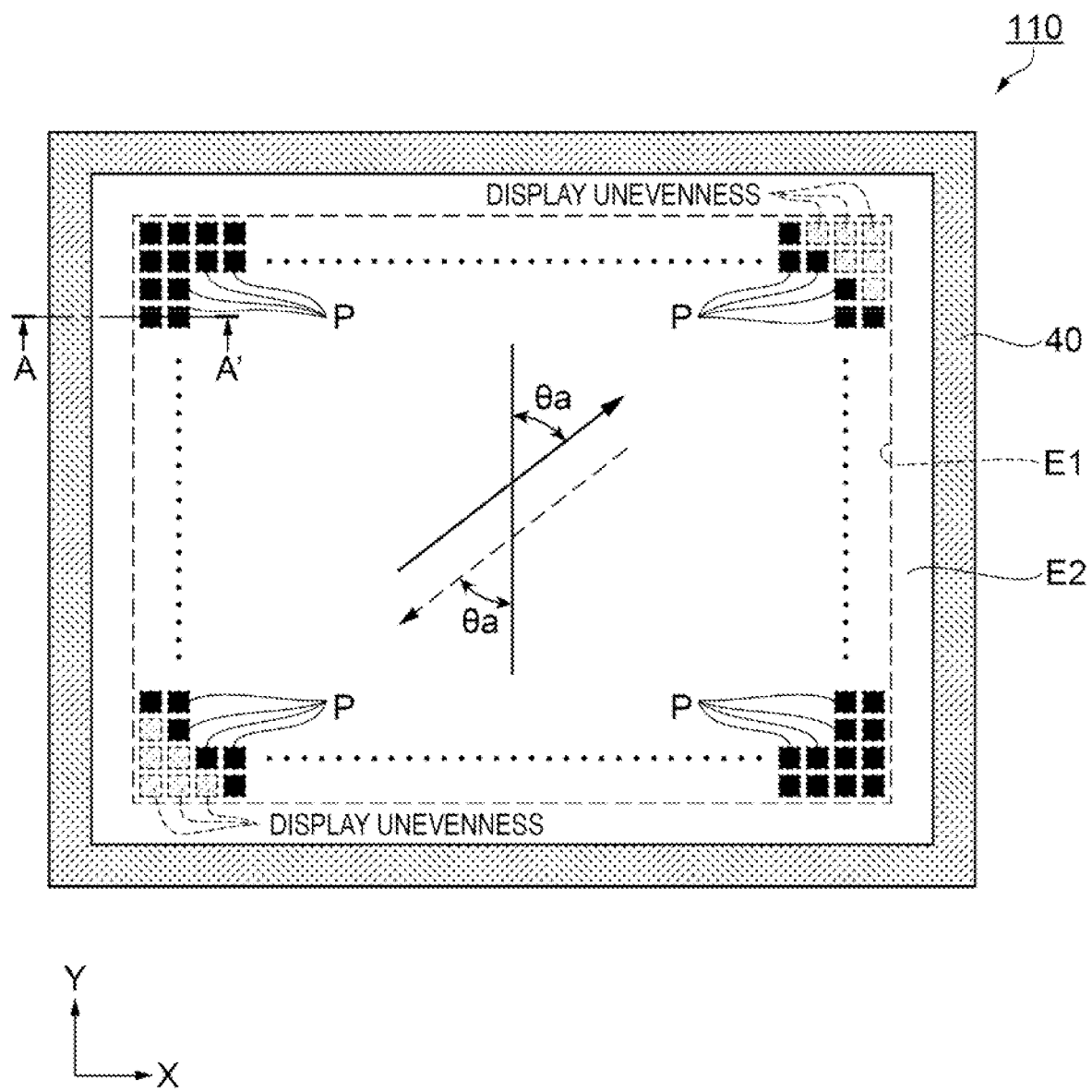
FIG. 4 is a plan view schematically illustrating a relationship between an oblique deposition direction of an inorganic material and a display problem caused by ionic impurities.

Next, with reference to FIG. 4, description will be made of an alignment direction of the liquid crystal molecules LC and a diffusion direction of ionic impurities in plan view. FIG. 4 is a plan view schematically illustrating a relationship between an oblique deposition direction of an inorganic material and a display problem caused by ionic impurities.

The region surrounded by the sealant 40 includes, as described above, the display region E1 in which the plurality of pixels P are arranged in a matrix shape, and also includes the peripheral region E2. As described above, in the present exemplary embodiment, as the optical design for the liquid crystal panel 110 is the normally black, and hence, the pixel P displays black in a not-driven state.

On the element substrate 10 side, the oblique deposition direction at the time of performing oblique deposition of an inorganic material to form the columnar bodies 18a and 24a constituting the alignment films 18 and 24 is, for example, a direction intersecting the direction Y at a predetermined angle θa and extending from the upper right toward the lower left as illustrated with the dashed arrow, as illustrated in FIG. 4. On the side of the counter substrate 20 disposed to oppose the element substrate 10, the oblique deposition direction is a direction intersecting the direction Y at the predetermined angle θa and extending from the lower left toward the upper right as illustrated with the solid arrow. The predetermined angle θa is, for example, 45 degrees. As described with reference to FIG. 3, the liquid crystal molecules LC are substantially vertically aligned to be pre-tilted in the film forming direction in oblique deposition, and hence, such an alignment state is called a substantially vertical alignment in a one-axis direction. The one-axis direction according to the present exemplary embodiment represents a direction intersecting the direction Y at the predetermined angle θa and extending from the upper right toward the lower left, or from the lower left toward the upper right. Note that the oblique deposition direction illustrated in FIG. 4 represents a direction when the liquid crystal device 100 is viewed from the counter substrate 20 side.

With the liquid crystal layer 50 being driven, the liquid crystal molecules LC behave (vibrates) as described above, and a flow of the liquid crystal molecules LC occurs in the oblique deposition direction (one-axis direction) near the interface between the liquid crystal layer 50 and the alignment film 18 and 24 as illustrated with the dashed or solid arrow illustrated in FIG. 4. If the liquid crystal layer 50 contains anion (−)based or cation (+)based ionic impurities, the ionic impurities may move along the flow of the liquid crystal molecules LC toward the corner portion at the lower left or the corner portion at the upper right in the display region E1, and be unevenly distributed (agglomerate). When the insulation resistance of the liquid crystal layer 50 in a pixel P located at a corner portion decreases due to uneven distribution of the ionic impurities, this leads to a decrease in drive potential at the pixel P. This results, for example, in display unevenness in which light leak occurs as illustrated in FIG. 4 or a burn-in phenomenon due to energization. In particular, when an inorganic alignment film is used for the alignment film 18 and 24, the inorganic alignment film is more likely to absorb ionic impurities, and hence, stain or unevenness of display or burn-in phenomenon more stands out due to uneven distribution of the ionic impurities as compared with an organic alignment film. Note that the location of stain or unevenness of display or burn-in occurring due to uneven distribution of ionic impurities is not limited to the corner portion at the lower left or the corner portion at the upper right as illustrated in FIG. 4. The location of occurrence varies depending on an alignment direction of the liquid crystal molecules LC or paths through which ionic impurities enter or states of diffusion as described above.

It is considered that ionic impurities are contained, for example, in materials such as adhesive or encapsulant used in processes for manufacturing the liquid crystal panel 110, or enter from environments related to the processes. In addition, the liquid crystal device 100 according to the present exemplary embodiment is used as a light modulation unit (light bulb) in a projection-type display device (projector) which will be described later, and hence, the intensity of incident illumination light is strong as compared with a direct-view type liquid crystal device. A terminal group of the liquid crystalline polymers LC that are organic compounds detaches due to high-intensity illumination light incoming into the liquid crystal layer 50, and may become ionic impurities.

In the liquid crystal device 100 according to the present exemplary embodiment, an ion trapping mechanism configured for sweeping ionic impurities from the display region E1 to collect them is provided in the peripheral region E2 surrounding the display region E1, to improve display problems such as stain or unevenness of display or burning phenomenon due to uneven distribution of ionic impurities. Below, the ion trapping mechanism and the driving method for the liquid crystal device 100 according to the present exemplary embodiment will be described.

Electrical Configuration of Liquid Crystal Device

Figure 5:
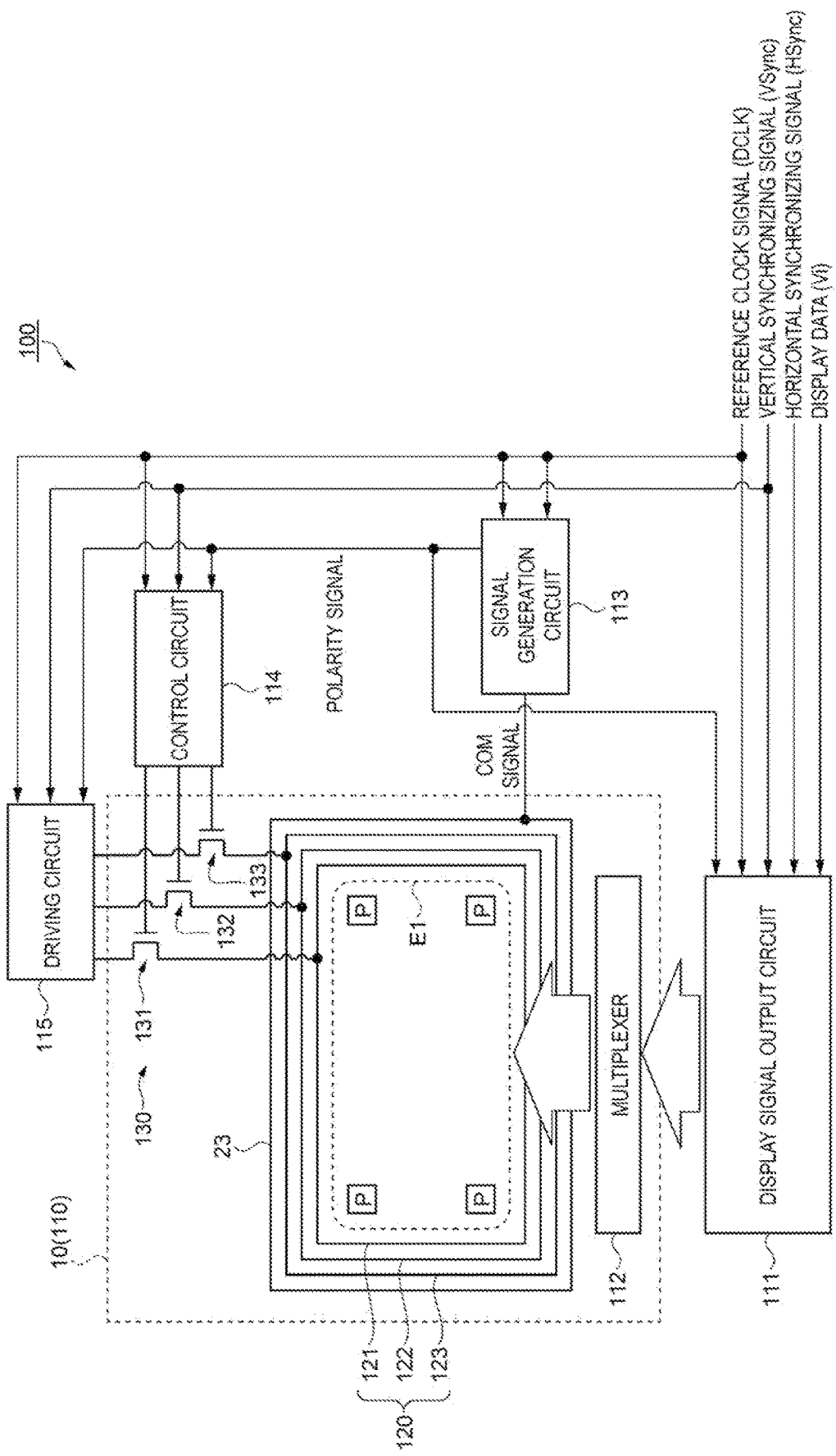
FIG. 5 is a block diagram illustrating the electrical configuration of the liquid crystal device according to the first exemplary embodiment.
Figure 6:
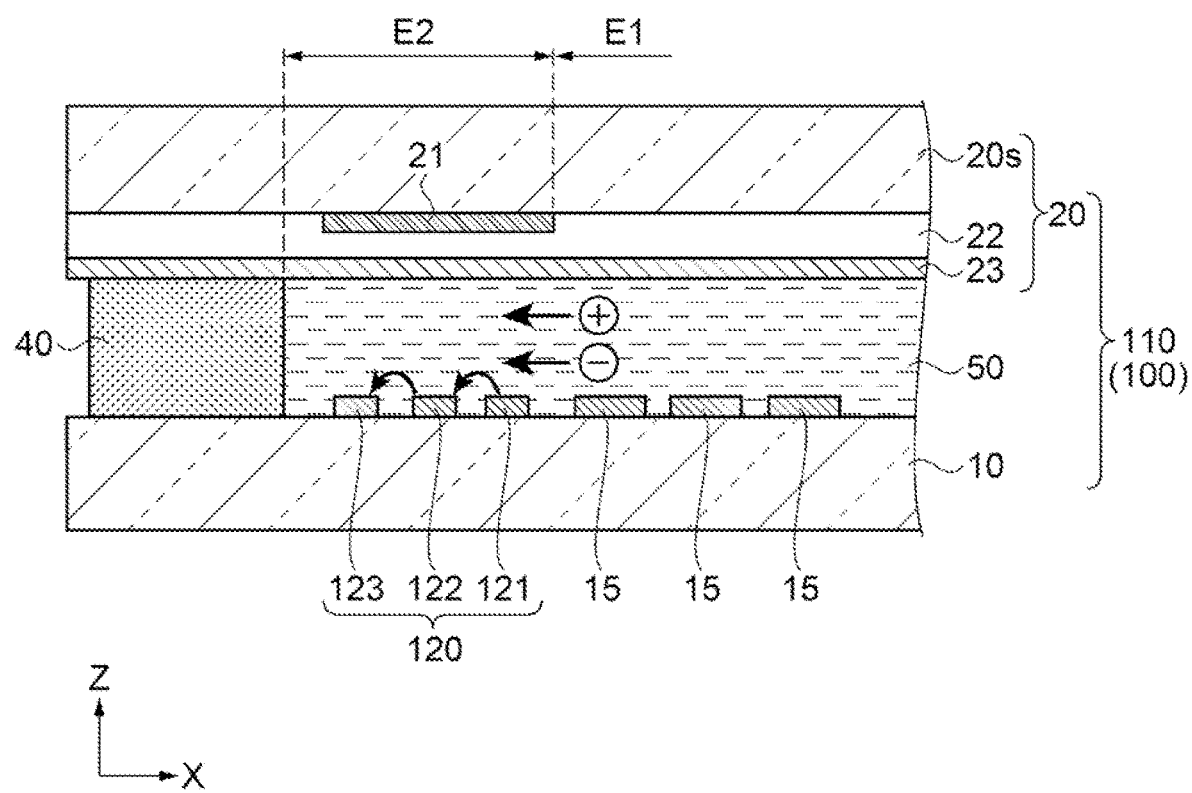
FIG. 6 is a schematic cross-sectional view illustrating the arrangement of a peripheral electrode in an ion trapping mechanism according to the first exemplary embodiment.

FIG. 5 is a block diagram illustrating the electrical configuration of the liquid crystal device according to the first exemplary embodiment. FIG. 6 is a schematic cross-sectional view schematically illustrating the arrangement of peripheral electrodes of an ion trapping mechanism according to the first exemplary embodiment.

As illustrated in FIG. 5, the liquid crystal device 100 includes a display signal output circuit 111, a multiplexer 112, a signal generation circuit 113, a control circuit 114, and a driving circuit 115, each of which serves as a circuit relating to driving the liquid crystal device. The liquid crystal panel 110 of the liquid crystal device 100 is provided with a plurality of pixels P in the display region E1. As described above, the pixel P includes the pixel electrode 15 (see FIG. 2), the TFT 30 (see FIG. 2) serving as a switching element for the pixel electrode 15, and a holding capacitor (not illustrated) for holding potentials applied to the pixel electrode 15. In the peripheral region E2 (see FIG. 1) surrounding the display region E1, a first electrode 121, a second electrode 122, and a third electrode 123, each of which has a frame shape, are provided to surround the display region E1. The first electrode 121, the second electrode 122, and the third electrode 123 are collectively referred to as a peripheral electrode 120 configured for ion trapping. Alternatively, these are also referred to as three electrodes 121, 122, and 123 configured for ion trapping. The counter electrode 23 is disposed to overlap the peripheral electrode 120 in plan view. The ion trapping mechanism according to the present exemplary embodiment includes the peripheral electrode 120 and the counter electrode 23 that are disposed to oppose each other by interposing the liquid crystal layer 50.

A first transistor 131 is provided between the first electrode 121 and the driving circuit 115. A second transistor 132 is provided between the second electrode 122 and the driving circuit 115. A third transistor 133 is provided between the third electrode 123 and the driving circuit 115. A gate of each of the first transistor 131, the second transistor 132, and the third transistor 133 is coupled to the control circuit 114. Each of the first transistor 131, the second transistor 132, and the third transistor 133 is constituted, for example, with an N type TFT. Hereinafter, the first transistor 131, the second transistor 132, and the third transistor 133 may be collectively referred to as transistor 130.

In the present exemplary embodiment, the multiplexer 112, the first transistor 131, the second transistor 132, and the third transistor 133 are provided on the element substrate 10 of the liquid crystal panel 110. The display signal output circuit 111, the signal generation circuit 113, the control circuit 114, and the driving circuit 115 are included in the driving IC 103 (see FIG. 1) mounted on the FPC 102 described above. Any of the display signal output circuit 111, the signal generation circuit 113, the control circuit 114, and the driving circuit 115, or part of these circuits may be provided on the element substrate 10.

The liquid crystal device 100 is supplied with display data (Vi), a horizontal synchronizing signal (Hsync), a vertical synchronizing signal (Vsync), and a reference clock signal (DCLK). In addition to these signals, a reference voltage (VSS), a driving voltage (VDD) or the like is supplied to drive the individual circuits described above, although illustration is not given in FIG. 5.

The display data (Vi), the horizontal synchronizing signal (Hsync), the vertical synchronizing signal (Vsync), and the reference clock signal (DCLK) are input into the display signal output circuit 111. Based on these signals, the display signal output circuit 111 generates a scanning signal (not illustrated in FIG. 5), a data signal and the like related to displaying. The data signal is supplied to each of the pixels P (TFT 30) through the multiplexer 112.

The vertical synchronizing signal (Vsync) and the reference clock signal (DCLK) are input into the signal generation circuit 113. Based on these signals, the signal generation circuit 113 generates a common signal (COM signal) and a polarity signal. The COM signal is a signal that varies at a first period between a first potential and a second potential that is smaller than the first potential, and is supplied to the counter electrode 23. The polarity signal is a logic signal for controlling a polarity of AC signals relating to the driving method for the liquid crystal device 100 that will be described later, and is supplied to each of the display signal output circuit 111, the control circuit 114, and the driving circuit 115.

The vertical synchronizing signal (Vsync), the reference clock signal (DCLK), and the polarity signal are input into the control circuit 114. Based on these signals, the control circuit 114 generates control signals relating to switching control (couple/uncouple) of the first transistor 131, the second transistor 132, and the third transistor 133.

The vertical synchronizing signal (Vsync), the reference clock signal (DCLK), and the polarity signal are input into the driving circuit 115. Based on these signals, the driving circuit 115 generates a driving signal for each of the first transistor 131, the second transistor 132, and the third transistor 133. The driving signal is a signal relating to the driving method for the liquid crystal device 100 that will be described later, and is a signal that varies between a third potential and a fourth potential that is smaller than the third potential.

The driving signal generated by the driving circuit 115 is supplied through the first transistor 131, the second transistor 132, and the third transistor 133 to the first electrode 121, the second electrode 122, and the third electrode 123, respectively, of the peripheral electrode 120 in a state where phases are shifted from each other. In other words, the driving circuit 115 generates driving signals to be applied to each of the three electrodes 121, 122, and 123 configured for ion trapping, the driving signals having the same frequency, the driving signals being signals of which phases are shifted from each other.

As illustrated in FIG. 6, on the element substrate 10 of the liquid crystal panel 110 (liquid crystal device 100), the first electrode 121, the second electrode 122, and the third electrode 123, which constitute the peripheral electrode 120, are disposed in the peripheral region E2 between the outer edge of the display region E1 and the sealant 40, and are provided at different positions and at different distances from the display region E1 to be spaced apart from each other. In the peripheral region E2, the peripheral electrode 120 of the element substrate 10 and the counter electrode 23 of the counter substrate 20 are disposed to oppose each other by interposing the liquid crystal layer 50. In the peripheral region E1, the pixel electrode 15 of the element substrate 10 and the counter electrode 23 of the counter substrate 20 are disposed to oppose each other by interposing the liquid crystal layer 50. In other words, the liquid crystal device 100 includes a liquid crystal capacitor (constituted with the pixel electrode 15, liquid crystal layer 50 and counter electrode 23) for each pixel P in the display region E1, and in the peripheral region E2, also includes a liquid crystal capacitor (constituted with the first electrode 121, the second electrode 122 and the third electrode 123, and with liquid crystal layer 50 and counter electrode 23) for each of the three electrodes 121, 122, and 123 of the pixel electrode 120.

In the present exemplary embodiment, by applying the driving signal generated by the driving circuit 115 to the peripheral electrode 120 through the transistor 130, AC signals are applied across the peripheral electrode 120 and the counter electrode 23, the AC signals changing at the second period, which is longer than the first period, between a positive polarity potential and a negative polarity potential taking a potential of the COM signal as a reference. In addition, the first electrode 121, the second electrode 122, and the third electrode 123 of the peripheral electrode 120 are applied driving signals of which phases are shifted from each other.

This causes an electric field to be generated between adjacent electrodes among the first electrode 121, the second electrode 122, and the third electrode 123. As time elapses, the electric field moves from the first electrode 121 on the display region E1 side to the second electrode 122, and further moves from the second electrode 122 to the third electrode 123 on the sealant 40 side. In addition, such movement of the electric field periodically repeats. In the present specification, such movement of electric field in the ion trapping mechanism is referred to as scrolling of electric field.

If the liquid crystal layer 50 contains cation (+)-based or anion (−)-based ionic impurities, the ionic impurities are attracted by the electric field occurring in the peripheral electrode 120, and are swept from the display region E1 toward the sealant 40 side with the scrolling of electric field.

As described above, since the ionic impurities are attracted by the peripheral electrode 120 and are swept to move away from the display region E1, electrically driving the peripheral electrode 120 is referred to as ion-surf driving in this specification.

Driving Method for Liquid Crystal Device

Figure 7:
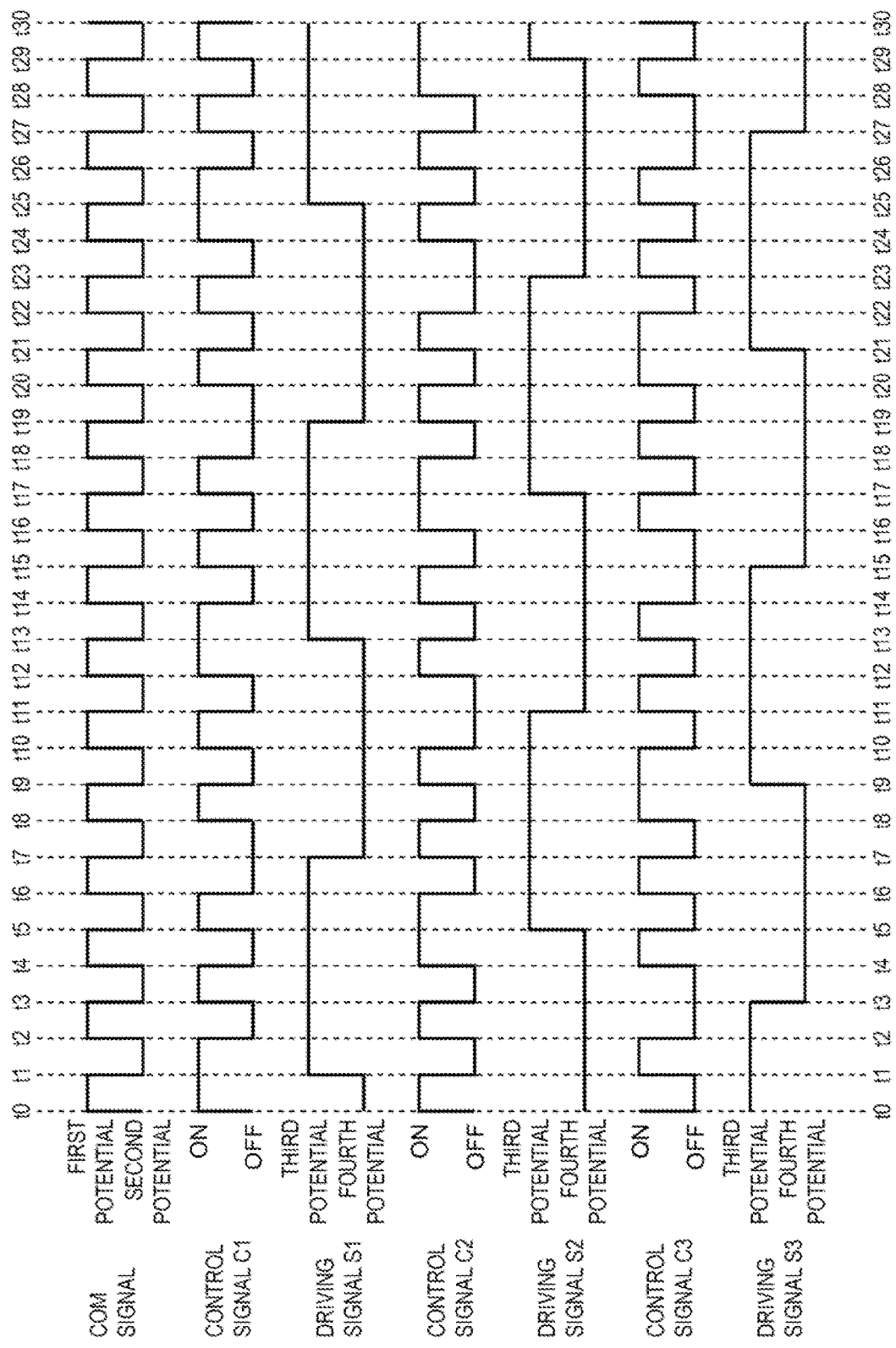
FIG. 7 is a timing chart illustrating a common signal, control signals, and driving signals according to an Example 1, in a driving method for a liquid crystal device according to a first exemplary embodiment.
Figure 8:
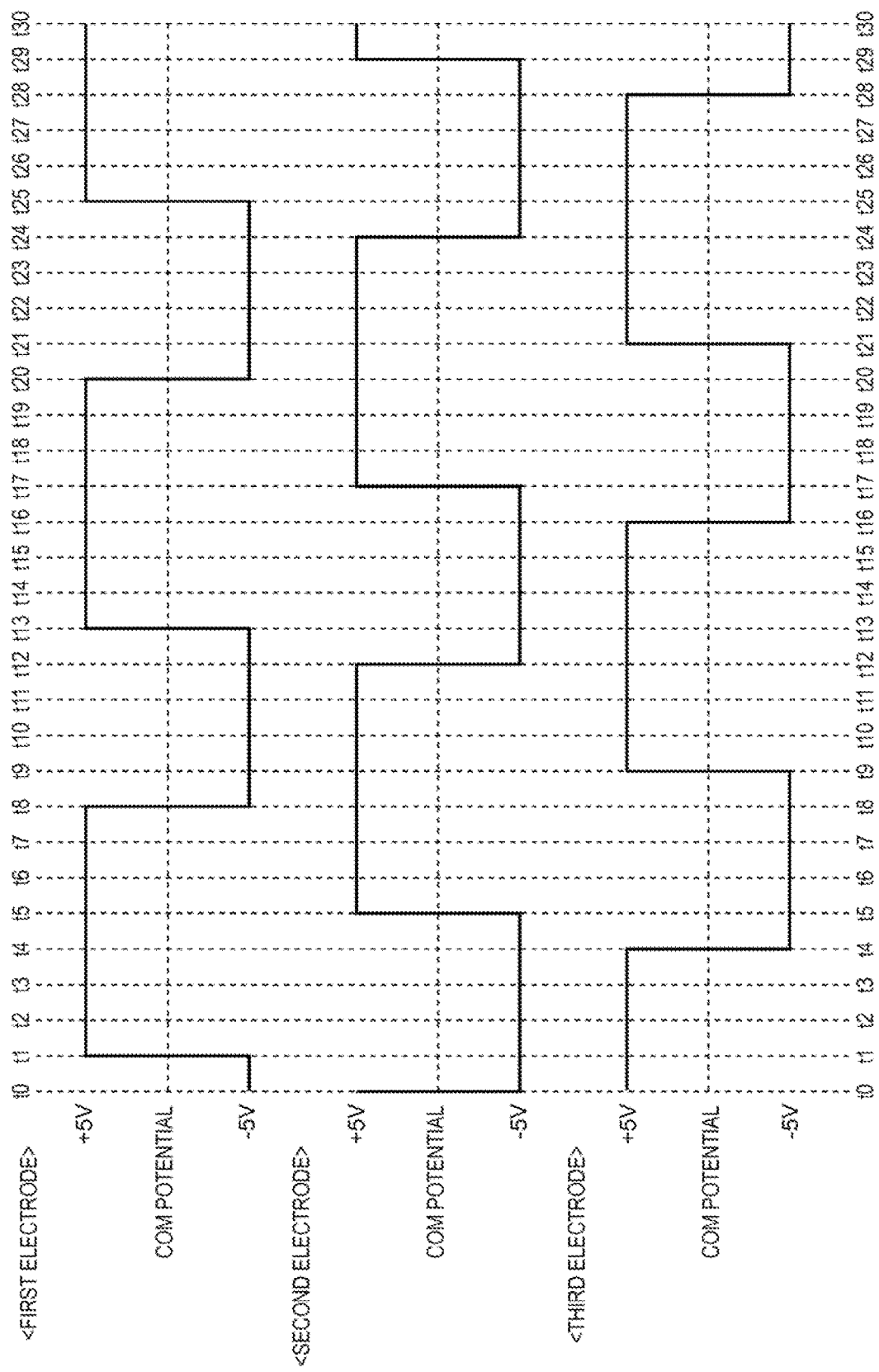
FIG. 8 is a timing chart illustrating AC signals according to the Example 1, in the driving method for a liquid crystal device according to the first exemplary embodiment.

Next, a driving method for the liquid crystal device 100 according to the present exemplary embodiment will be described with reference to FIGS. 7 and 8. FIG. 7 is a timing chart illustrating the common signal, the control signal, and the driving signal according to Example 1, in the driving method for a liquid crystal device according to the first exemplary embodiment. FIG. 8 is a timing chart illustrating the AC signals according to Example 1, in the driving method for a liquid crystal device according to the first exemplary embodiment. The horizontal axis in FIGS. 7 and 8 represents the axis of time from t0 to t30 in a unit a unit of a duration equal to ½ (one vertical duration) of the first period of the common signal (COM signal). In addition, the vertical axis concerning each signal represents an electric potential. The driving method for a liquid crystal device according to the present exemplary embodiment is made to reduce electric energy consumption of the liquid crystal device 100 when the ion-surf driving and the common inversion driving are combined.

The driving method for the liquid crystal device 100 according to the present exemplary embodiment applies the counter electrode 23 serving as a common electrode with the COM signal that varies in the first period between the first potential and the second potential that is smaller than the first potential. A driving signal that varies between the third potential and the fourth potential that is smaller than the third potential is input to the transistor 130 serving as a switching element. Using the transistor 130, the driving signal is coupled or uncoupled to each of the first electrode 121, the second electrode 122, and the third electrode 123 of the peripheral electrode 120 in an unit of a duration equal to ½ (one vertical duration) or less of the first period of the COM signal. AC signals, each of which varies between the positive polarity potential and the negative polarity potential in the second period that is longer than the first period, are input to the first electrode 121, the second electrode 122, and the third electrode 123 in a state where phases of the signals are shifted with each other, taking a potential of the COM signal as a reference. Below, the method of driving the liquid crystal device 100 will be described using specific examples.

EXAMPLE 1

In FIG. 7, the first potential of the COM signal according to Example 1 is, for example, 5 V, and the second potential is, for example, 0 V. The frequency of the COM signal is, for example, 120 Hz. Thus, the first period in which the electric potential of the COM signal varies from the second potential to the first potential, varies from the first potential to the second potential, and varies to the first potential again is 8.4 ms (milliseconds), and one vertical duration when the electric potential of the COM signal is at the first potential or the second potential is approximately 4.2 ms (milliseconds).

C1 represents a control signal generated by the control circuit 114 and input into the gate of the first transistor 131. S1 represents a driving signal generated by the driving circuit 115 and input into the source of the first transistor 131. Similarly, C2 represents a control signal input into the gate of the second transistor 132, and S2 represents a driving signal input into the source of the second transistor 132. In addition, C3 represents a control signal input into the gate of the third transistor 133, and S3 represents a driving signal input into the source of the third transistor 133.

The third potential of the driving signal S1, S2, S3 is, for example, 5 V, and the fourth potential is, for example, 0 V. In the Example 1, the period of the driving signal S1, S2, S3 is six times the first period of the COM signal, and is 50.4 ms. Thus, the frequency of the driving signal S1, S2, S3 is approximately 20 Hz. The phases of the driving signals S1, S2, and S3 are shifted with each other by ⅓ of one period. In FIG. 7, the frequency of the driving signal S1, S2, S3 is set to 20 Hz to recognize the state of change in the potential of the three driving signals S1, S2, S3. However, the frequency is not limited to this.

The control signal C1, C2, C3 input into the gate of the transistor 130 is a signal that make the transistor 130 ON (coupled state) or OFF (uncoupled state) in a unit of a duration equal to ½ (one vertical duration) of the first period of the COM signal, and is set in advance by considering the potential of the driving signal S1, S2, S3 and the potential of the COM signal.

Next, with reference to FIGS. 7 and 8, specific description will be made of the relationship between the control signal C1 and the driving signal S1, and a change in potential of the first electrode 121 relative to the potential (COM potential) of the COM signal, the change being made by the driving signal S1 applied through the first transistor 131.

As illustrated in FIG. 7, the COM signal varies at the time t0 from the second potential (0 V) to the first potential (5 V), and is maintained at the first potential (5 V) from the time t0 to the time t1. In addition, the COM signal varies at the time t1 from the first potential (5 V) to the second potential (0 V), and is maintained at the second potential (0 V) from the time t1 to the time t2. The period from the time t0 to the time t2 is the first period, and is 8.4 ms (milliseconds) as described above. After this, the potential varies in the first period between the first potential (5 V) and the second potential (0 V).

The driving signal S1 stays at the fourth potential (0 V) from the time t0 to the time t1, varies at the time t1 from the fourth potential (0 V) to the third potential (5 V), and is maintained at the third potential (5V) from the time t1 to the time t7. In addition, the driving signal S1 varies at the time t7 from the third potential (5 V) to the fourth potential (0 V), and is maintained at the fourth potential (0 V) from the time t7 to the time t13. The period from the time t1 to the time t13 is the period of the driving signal S1, and is 50.4 ms (milliseconds) as described above. After this, with this period, the driving signal S1 varies between the fourth potential (0 V) and the third potential (5 V).

The control signal C1 turns ON from the time t0 to time t2 when the driving signal S1 varies from the fourth potential (0 V) to the third potential (5 V). In unit of one vertical duration of the COM signal, the control signal C1 repeats ON and OFF between the time t2 and the time t6 when the driving signal S1 stays at the third potential (5 V). Then, the control signal C1 turns OFF from the time t7 to the time t8 when the driving signal S1 varies from the third potential (5 V) to the fourth potential (0 V). In addition, the control signal C1 repeats ON and OFF between the time t8 and the time t12 when the driving signal S1 stays at the fourth potential (0 V) in unit of one vertical duration of the COM signal. Then, the control signal C1 turns ON again from the time t12 to the time t13 when the driving signal S1 varies from the fourth potential (0 V) to the third potential (5 V). After this, the control signal C1 repeats the ON state and the OFF state according to such variation of the potential of the driving signal S1.

The first transistor 131 coupled to the first electrode 121 is controlled using the control signal C1 to be ON (coupled state) and OFF (uncoupled state). Thus, since the potential (COM potential) of the COM signal stays at the first potential (5 V) between the time t0 and time t1, and the control signal C1 is ON as illustrated in FIG. 7, the driving signal S1 is applied to the first electrode 121 through the first transistor 131. At this time, the potential of the driving signal S1 stays at the fourth potential (0 V), and hence, the potential of the first electrode 121 relative to the COM potential is −5 V as illustrated in FIG. 8. Since the COM potential stays at the second potential (0 V) between the time t1 and time t2, and the control signal C1 is ON as illustrated in FIG. 7, the driving signal S1 is applied to the first electrode 121 through the first transistor 131. At this time, the potential of the driving signal S1 stays at the third potential (5 V), and hence, the potential of the first electrode 121 relative to the COM potential is +5 V as illustrated in FIG. 8. Since the COM potential stays at the first potential (5 V) between the time t2 and time t3, and the control signal C1 is OFF as illustrated in FIG. 7, the driving signal S1 is not applied to the first electrode 121. At this time, the potential of the first electrode 121 is maintained to be at a potential charged between the time t1 and the time t2 using the liquid crystal capacitor including the counter electrode 23 disposed to oppose the first electrode 121 by interposing the liquid crystal layer 50, and hence, the potential of the first electrode 121 relative to the COM potential is +5 V as illustrated in FIG. 8.

As illustrated in FIG. 7, the control signal C1 repeats ON and OFF from the time t3 to the time t7 such that the control signal C1 is ON during a vertical duration when the COM signal is at the second potential (0 V), and the control signal C1 is OFF during a vertical duration when the COM signal is at the first potential (5 V). Thus, the potential of the driving signal S1 applied when the control signal C1 is ON is charged in the liquid crystal capacitor, and the potential of the first electrode 121 relative to the COM potential during this duration is maintained when the control signal C1 is OFF. For this reason, the potential of the first electrode 121 relative to the COM potential is +5 V as illustrated in FIG. 8.

As illustrated in FIG. 7, the COM signal is at the second potential (0 V) from the time t7 to the time t8, and the control signal C1 is OFF, and hence, the potential of the first electrode 121 relative to the COM potential is equal to the potential from the time t6 to the time t7 when charging is performed in the liquid crystal capacitor. Thus, the potential of the first electrode 121 is +5 V as illustrated in FIG. 8. As illustrated in FIG. 7, from the time t8 to the time t9, the COM signal is at the first potential (5 V), the control signal C1 is ON, and the driving signal S1 is at the fourth potential (0 V). Thus, the potential of the first electrode 121 relative to the COM potential is −5 V as illustrated in FIG. 8. As illustrated in FIG. 7, the control signal C1 repeats OFF and ON from the time t9 to the time t13 such that the control signal C1 is OFF in a vertical duration when the COM signal is at the second potential (0 V), and the control signal C1 is ON in a vertical duration when the COM signal is at the first potential (5 V). Thus, the fourth potential (0 V) of the driving signal S1 applied when the control signal C1 is ON is charged in the liquid crystal capacitor, and the potential of the first electrode 121 relative to the COM potential during this duration is maintained when the control signal C1 is OFF. For this reason, the potential of the first electrode 121 relative to the COM potential is −5 V as illustrated in FIG. 8.

In other words, in one period of the driving signal S1 from the time t1 to the time t13, the potential of the first electrode 121 relative to the COM potential is the positive polarity of +5 V in seven vertical durations from the time t1 to time t8, and is the negative polarity of −5 V in five vertical durations from the time t8 to the time t13. In other words, an AC signal that varies between the positive polarity potential (+5 V) and the negative polarity potential (−5V), taking a potential of the COM signal as a reference, is applied to the first electrode 121, at the second period that is longer than the first period of the COM signal.

The potential, which is relative to the COM potential, of the second electrode 122 to which the driving signal S2 is applied through the second transistor 132 is also controlled using the control signal C2 and the driving signal S2, as with the case of the first electrode 121 described above. The phase of the driving signal S2 is shifted from the driving signal S1 by ⅓ period as illustrated in FIG. 7, and hence, in one period of the driving signal S2 from the time t5 to the time t17, the potential of the second electrode 122 relative to the COM potential is a positive polarity of +5 V in seven vertical durations from the time t5 to the time t12, and is a negative polarity of −5 V in five vertical durations from the time t12 to the time t17 as illustrated in FIG. 8. In other words, an AC signal that varies between the positive polarity potential (+5 V) and the negative polarity potential (−5 V), taking a potential of the COM signal as a reference, is applied to the second electrode 122 at the second period that is longer than the first period of the COM signal, in a state where the phase is shifted by ⅓ period from the AC signal applied to the first electrode 121.

The potential, which is relative to the COM potential, of the third electrode 123 to which the driving signal S3 is applied through the third transistor 133 is also controlled using the control signal C3 and the driving signal S3, as with the case of the second electrode 122 described above. The phase of the driving signal S3 is shifted from the driving signal S2 by ⅓ period as illustrated in FIG. 7, and hence, in one period of the driving signal S3 from the time t9 to the time t21, the potential of the third electrode 123 relative to the COM potential is a positive polarity of +5 V in seven vertical durations from the time t9 to the time t16, and is a negative polarity of −5 V in five vertical durations from the time t16 to the time t21 as illustrated in FIG. 8. In other words, an AC signal that varies between the positive polarity potential (+5 V) and the negative polarity potential (−5 V), taking a potential of the COM signal as a reference, is applied to the third electrode 123 at the second period that is longer than the first period of the COM signal, in a state where the phase is shifted by ⅓ period from the AC signal applied to the second electrode 122.

In other words, during a duration when the polarity of the potential of the first electrode 121 relative to the COM potential is the positive polarity, the polarity of the potential of the second electrode 122, adjacent to the first electrode 121, relative to the COM potential varies from the negative polarity to the positive polarity. In addition, during a duration when the polarity of the potential of the second electrode 122 relative to the COM potential is the positive polarity, the polarity of the potential of the third electrode 123, adjacent to the second electrode 122, relative to the COM potential varies from the negative polarity to the positive polarity. Furthermore, during a duration when the polarity of the potential of the first electrode 121 relative to the COM potential is the negative polarity, the polarity of the potential of the second electrode 122, adjacent to the first electrode 121, relative to the COM potential varies from the positive polarity to the negative polarity. Moreover, during a duration when the polarity of the potential of the second electrode 122 relative to the COM potential is the negative polarity, the polarity of the potential of the third electrode 123, adjacent to the second electrode 122, relative to the COM potential varies from the positive polarity to the negative polarity. In other words, as the polarity of the potential, relative to the COM potential, across three electrodes 121, 122, and 123 periodically changes, the scrolling of electric field described above occurs in the peripheral electrode 120.

In the driving method for a liquid crystal device according to Example 1, the driving signal is intermittently applied to the peripheral electrode 120 through the transistor 130 serving as a switching element, and hence, it is possible to reduce the width of voltage of the driving signal to reduce the energy consumption, as compared with a comparative example in which the ion-surf driving and the common inversion driving are simply combined.

EXAMPLE 2

Figure 9:
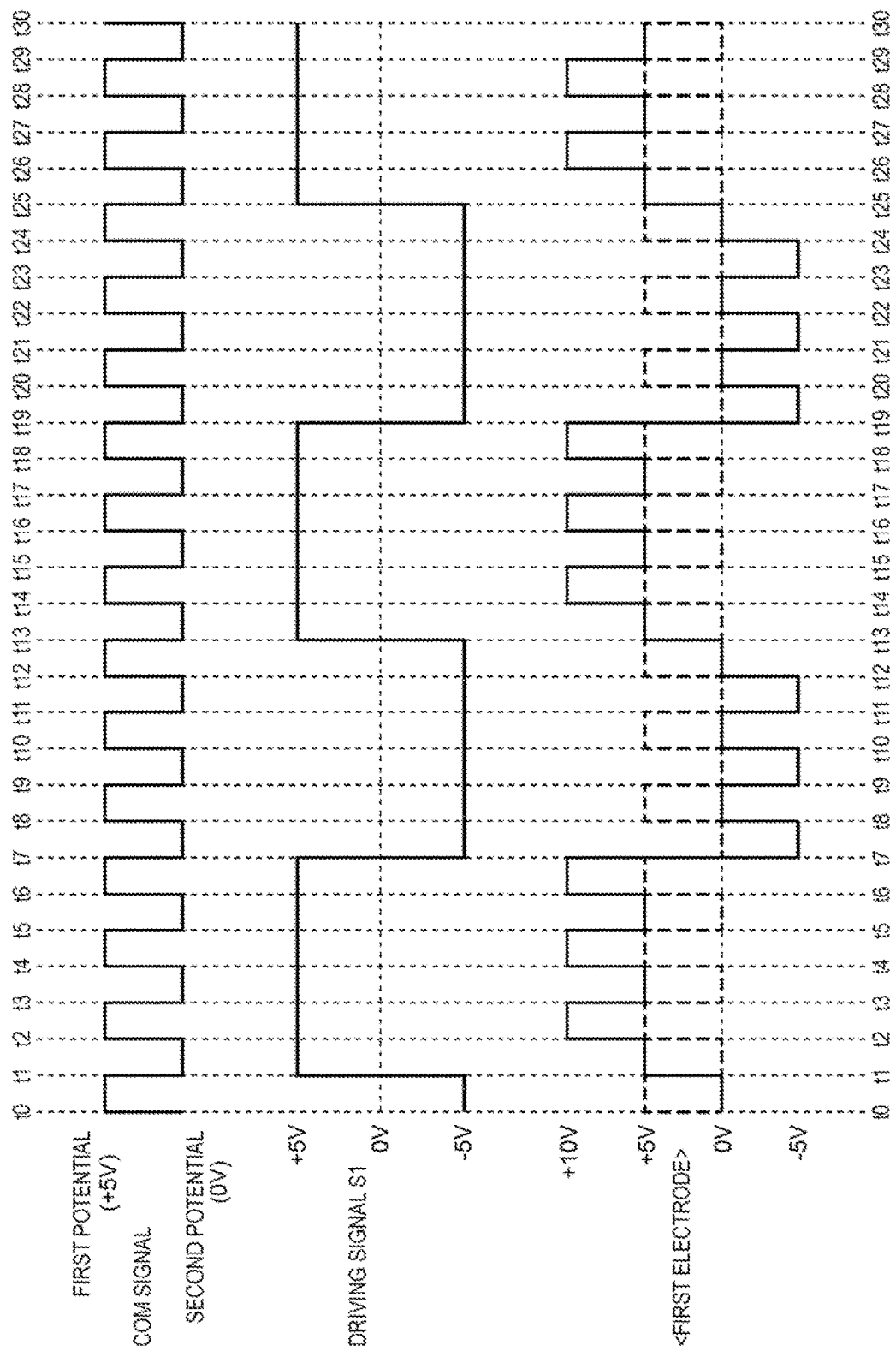
FIG. 9 is a timing chart illustrating a common signal, a driving signal, and an AC signal according to an Example 2, in the driving method for a liquid crystal device according to the first exemplary embodiment.

Next, a driving method for a liquid crystal device according to Example 2 will be described with reference to FIG. 9. FIG. 9 is a timing chart illustrating the common signal, the driving signal, and the AC signal in the driving method for a liquid crystal device according to Example 2. With respect to Example 1, the driving method for a liquid crystal device according to Example 2 is an example in which the driving signal is applied directly to the peripheral electrode 120 without passing through the transistor 130. Below, description will be made of a case where the driving signal S1 is applied to the first electrode 121 among the peripheral electrode 120, as an example. More specifically, in the driving method for a liquid crystal device according to Example 2, the COM signal is a signal that varies in the first period between the first potential (5 V) and the second potential (0 V) that is smaller than the first potential, as illustrated in FIG. 9. The first period is 8.4 ms (milliseconds) as with the COM signal according to Example 1. In other words, the frequency of the COM signal is 120 Hz.

The driving signal S1 according to Example 2 applied to the first electrode 121 is a signal of which potential varies between −5 V and +5 V. The period of the driving signal S1 is six times the first period, and is 50.4 ms (milliseconds) as in the Example 1.

In the Example 2, the driving signal S1 of which potential varies between −5 V and +5 V is applied to the first electrode 121, taking a potential of the COM signal to which the common inversion driving is reflected as the reference. Thus, from the time t0 to the time t1, the COM signal is at the first potential (5V) and the potential of the driving signal S1 is −5 V, and hence, the potential of the first electrode 121 relative to the COM potential is 0 V as illustrated in FIG. 9. From the time t1 to the time t7, the COM signal varies between the second potential (0 V) and the first potential (5 V) in unit of one vertical duration. On the other hand, the potential of the driving signal S1 is +5 V and stays constant, and hence, the potential of the first electrode 121 varies between +5 V and +10 V in unit of one vertical duration. From the time t7 to the time t13, the COM signal varies between the second potential (0 V) and the first potential (5 V) in unit of one vertical duration. On the other hand, the potential of the driving signal S1 is −5 V and stays constant, and hence, the potential of the first electrode 121 varies between −5 V and 0 V in unit of one vertical duration of the COM signal. From the time t13 to the time t14, the COM signal is at the second potential (0 V) and the potential of the driving signal S1 is +5 V, and hence, the potential of the first electrode 121 relative to the COM potential is +5 V. In other words, the AC signal applied to the first electrode 121 according to Example 2 is an AC signal of which potential varies, taking a potential of the COM signal as a reference, between 10 V at the maximum on the positive polarity side and −5 V at the maximum on the negative polarity side in unit of one vertical duration of the COM signal.

In other words, according to the driving method for a liquid crystal device of Example 2, the COM signal that varies at the first period between the first potential and the second potential is supplied to the counter electrode 23. Thus, the common inversion driving can be performed, and hence, it is possible to prevent a reduction in display quality due to degradation of the liquid crystal material. Furthermore, the first electrode 121, the second electrode 122, and the third electrode 123 are supplied with the AC signal of which phases differ. Thus, it is possible to sweep ionic impurities from the display region E1 to the peripheral region E2, and hence, it is possible to prevent display unevenness. In addition, as compared with Example 1, the liquid crystal device of Example 2 can be driven without providing the peripheral electrode 120 with the transistor 130, and hence, the required cost can be reduced.

EXAMPLE 3

Figure 10:
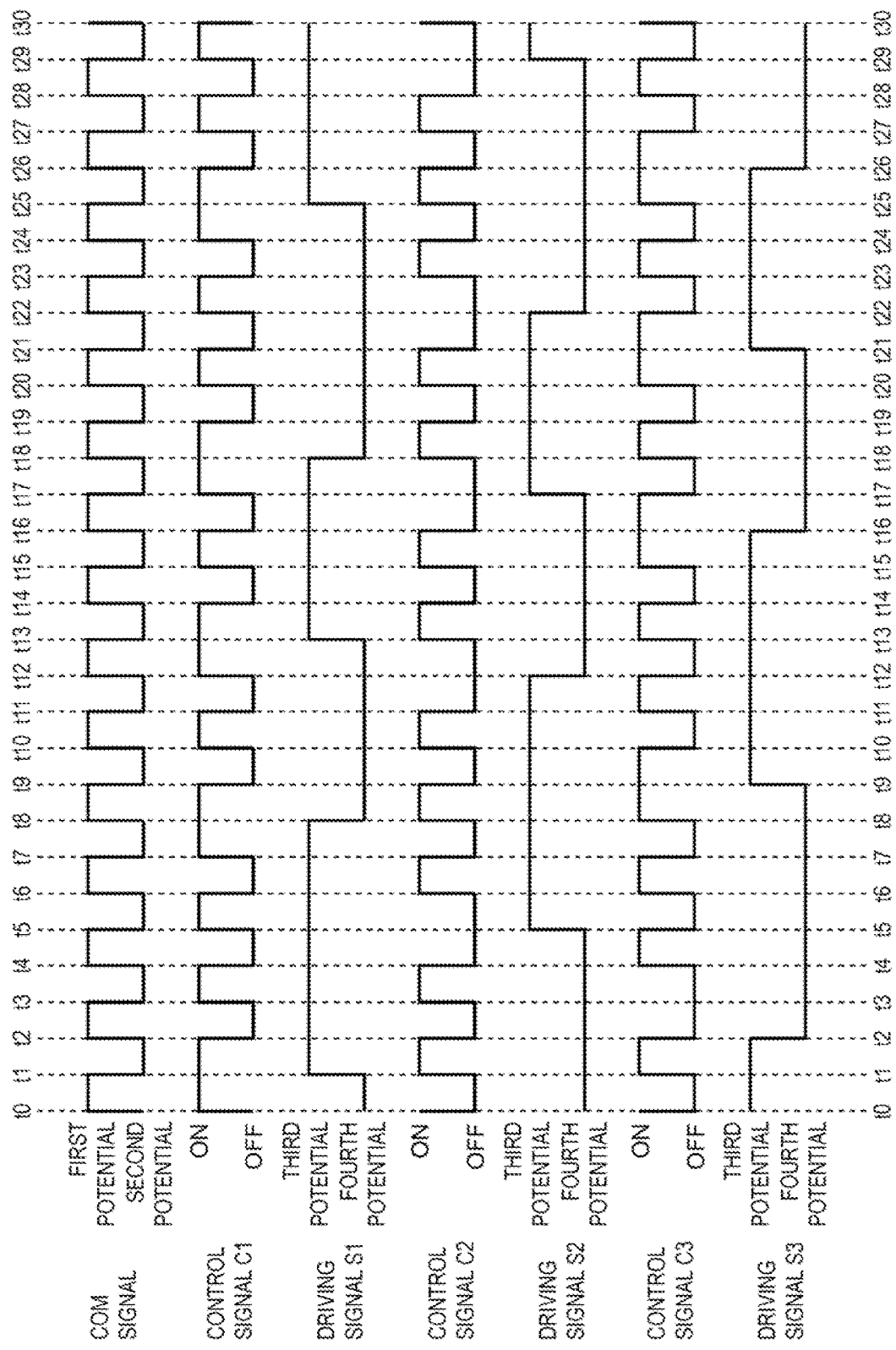
FIG. 10 is a timing chart illustrating a common signal, control signals, and driving signals according to an Example 3, in the driving method for a liquid crystal device according to the first exemplary embodiment.
Figure 11:
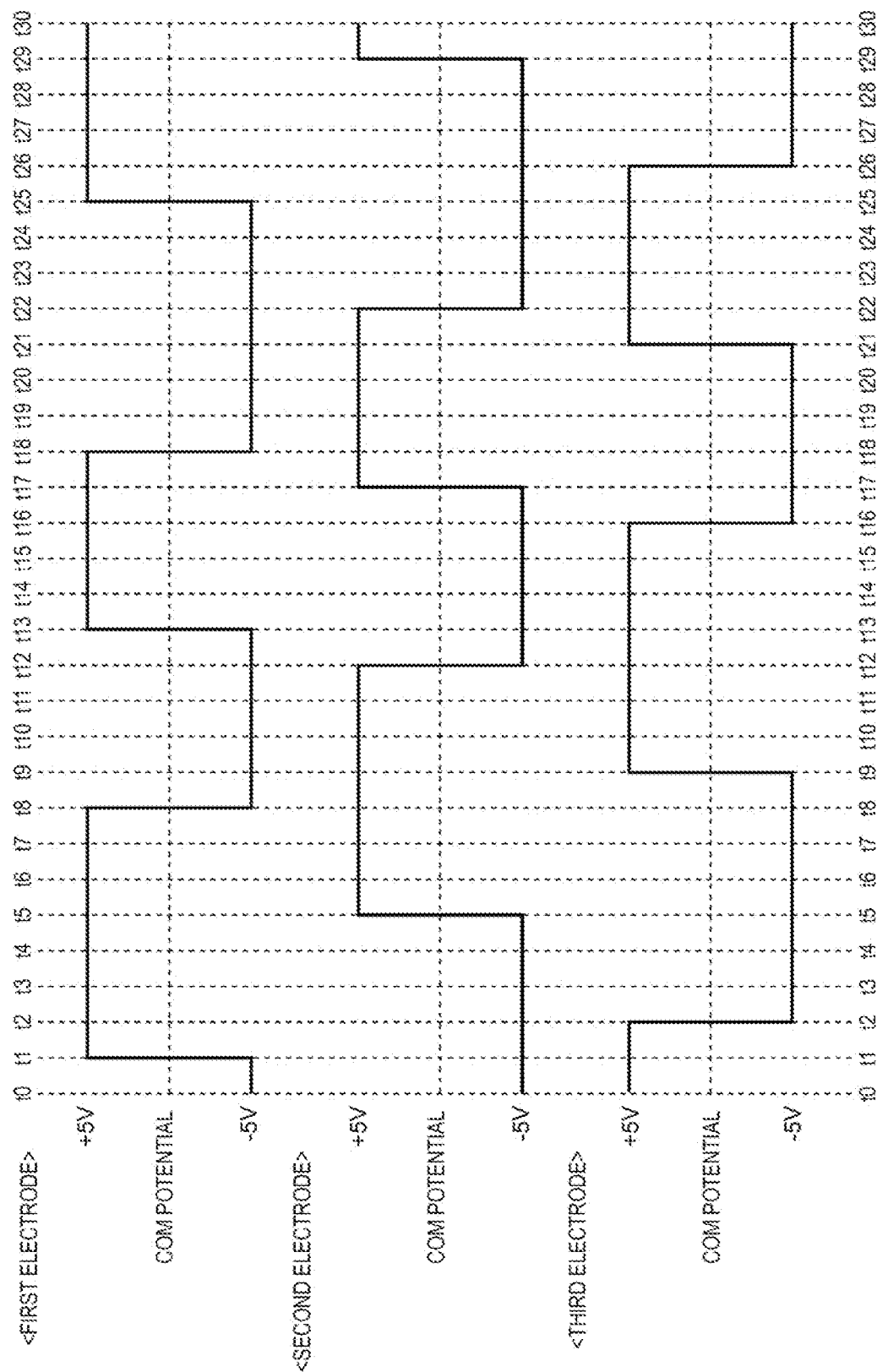
FIG. 11 is a timing chart illustrating AC signals according to the Example 3, in the driving method for a liquid crystal device according to the first exemplary embodiment.

Next, a driving method for a liquid crystal device according to Example 3 will be described with reference to FIGS. 10 and 11. FIG. 10 is a timing chart illustrating the common signal, the control signal, and the driving signal according to Example 3, in the driving method for a liquid crystal device according to the first exemplary embodiment. FIG. 11 is a timing chart illustrating the AC signals according to Example 3, in the driving method for a liquid crystal device according to the first exemplary embodiment. In the driving method for a liquid crystal device according to Example 3, the mode of the driving signal differs from that in Example 1.

In the driving method for a liquid crystal device according to Example 3, the COM signal is a signal that varies in the first period between the first potential (5 V) and the second potential (0 V) that is smaller than the first potential, as illustrated in FIG. 10. The first period is 8.4 ms (milliseconds) as with the COM signal according to Example 1. In other words, the frequency of the COM signal is 120 Hz.

The driving signal S1 stays at the fourth potential (0 V) between the time t0 and the time t1, varies at the time t1 from the fourth potential (0 V) to the third potential (5V), and is maintained at the third potential (5 V) between the time t1 and the time t8. In addition, the driving signal S1 varies at the time t8 from the third potential (5 V) to the fourth potential (0 V), and is maintained at the fourth potential (0 V) between the time t8 and the time t13. The drive signal S1 varies at the time t13 from the fourth potential (0 V) to the third potential (5 V), and is maintained at the third potential (5 V) between the time t13 and the time t18. Furthermore, the driving signal S1 varies at the time t18 from the third potential (5 V) to the fourth potential (0 V), and is maintained at the fourth potential (0 V) between the time t18 and the time t25.

In the case of the driving signal S1 according to Example 1 described above, the duration with the third potential (5 V) being maintained for six vertical durations of the COM signal and the duration with the fourth potential (0 V) being maintained for six vertical durations of the COM signal are repeated (see FIG. 7). When such a driving signal S1 is applied to the first electrode 121 through the first transistor 131 for which ON and OFF are controlled using the controlled signal C1, the potential (in other words, the AC signal substantially applied to the first electrode 121) of the first electrode 121 relative to the COM potential is maintained at the positive polarity potential (+5 V) for seven vertical durations of the COM signal, and then, is maintained at the negative polarity potential (−5 V) for five vertical durations of the COM signal, and these cycles are repeated. Thus, in a period of the AC signal, the duration in which the positive polarity potential is maintained and the duration in which the negative polarity potential is maintained are not equal to each other, and differ. More specifically, in a period of the AC signal, the duration in which the positive polarity potential is maintained is longer than the duration in which the negative polarity potential is maintained.

Unlike such Example 1, the driving signal S1 according to Example 3, the third potential (5 V) continues for seven vertical durations of the COM signal, and then, the fourth potential (0 V) continues for five vertical durations of the COM signal. In addition, the third potential (5 V) continues for five vertical durations of the COM signal, and then, the fourth potential (0 V) continues for seven vertical durations of the COM signal. These cycles are repeated.

With the mode of the driving signal S1 according to Example 3 as described above, the potential of the first electrode 121 relative to the COM potential stays at the positive polarity potential (+5 V) from the time t1 to the time t8 ((6+1) vertical durations of the COM signal), stays at the negative polarity potential (−5 V) from the time t8 to the time t13 ((6−1) vertical durations of the COM signal), stays at the positive polarity potential (+5 V) from the time t13 to the time t18 ((6−1) vertical durations of the COM signal), and stays at the negative polarity potential (−5 V) from the time t18 to the time t25 ((6+1) vertical durations of the COM signal), as illustrated in FIG. 11. That is to say, in the AC signal substantially applied to the first electrode 121, the duration with positive polarity potential and the duration with negative polarity potential are equal to each other in unit of a duration of double of one period. In other words, the average of period of the AC signal applied to the first electrode 121 is an integral multiple (n times) of 6 of first period of the COM signal, and the AC signal in which a period of n×(6+1) and a period of n×(6−1) are repeated is applied to the first electrode 121. Note that the phase of the AC signal applied to the second electrode 122 and the third electrode 123, except for the first electrode 121, of the peripheral electrode 120 configured for ion trapping is shifted from the phase of the AC signal applied to the first electrode 121. However, the duration in which the polarity is the positive polarity and the duration in which the polarity is the negative polarity are similarly equal to each other in the unit of a duration of double of one period of the AC signal.

According to the driving method for a liquid crystal device according to Example 3 as described above, the AC signal is applied to the peripheral electrode 120 such that the duration with positive polarity potential and the duration with negative polarity potential are equal to each other in the unit of a duration of double of one period of the AC signal, and hence, it is possible to eliminate unevenness of polarity of potential in the peripheral electrode 120. The cation (+)-based or anion (−)-based ionic impurities attracted by the peripheral electrode 120 are prevented from stagnating due to uneven polarity of potential in the peripheral electrode 120, and the ionic impurities are smoothly swept from the display region E1 to the sealant 40 side with the scrolling of electric field from the first electrode 121 to the third electrode 123.

Note that, as with the driving method for a liquid crystal device according to Example 1, even if the duration in which the potential of the peripheral electrode 120 has positive polarity and the duration in which the potential has negative polarity differ in the period of the alternative signal, it is possible to sweep the cation (+)-based or anion (−)-based ionic impurities outward from the display region E1, by setting the driving signal such that both of the durations are sufficiently long.

As indicated in Example 1 and Example 3, the transistor 130 is in a coupled state in all or some of first duration in which the COM signal has the first potential (for example, 5 V) and the AC signal has the negative potential (−5 V) or second duration in which the COM signal has the second potential (for example, 0 V) and the AC signal has the positive potential (+5 V), and the transistor 130 is in an uncoupled state in other durations. Furthermore, when the COM signal is in the above-described first duration and the transistor 130 is in a coupled state, the driving signal may have the fourth potential, and when the COM signal is in the above-described second duration and the transistor 130 is in a coupled state, the driving signal may have the third potential. In this case, the potential given to the peripheral electrode 120 by the driving signal can be controlled in a unit of a duration equal to ½ of the first period of the COM signal. That is, a duration in which the AC signal applied to the peripheral electrode 120 has a positive potential taking the potential of the COM signal as a reference and a duration in which the AC signal has a negative potential can be adjusted as appropriate. Especially, the potential of the AC signal is charged and maintained, as the potential of the peripheral electrode 120, in the liquid crystal capacitor constituted by the peripheral electrode 120 and the counter electrode 23 that are disposed to oppose each other with the liquid crystal layer 50 interposed between the peripheral electrode 120 and the counter electrode 23. Thus, as the duration of charging the potential of the AC signal in the liquid crystal capacitor is shorter, or as the electric capacitance of the liquid crystal capacitor is smaller, it is more difficult to maintain a positive potential or a negative potential in the peripheral electrode 120. Accordingly, from the viewpoint of sweeping ionic impurities by the scrolling of electric field, the peripheral electrode 120 needs to maintain a positive potential or a negative potential in a predetermined duration, and it is more preferable that the transistor 130 be in a coupled state in all the first duration in which the COM signal has the first potential (for example, 5 V) and the AC signal has the negative potential (−5 V) and all the second duration in which the COM signal has the second potential (for example, 0 V) and the AC signal has the positive potential (+5 V).

Furthermore, as indicated in Example 3, the average of the periods of the AC signal is preferably an integer multiple (n times) of 6 of the first period of the COM signal, and the AC signal repeating a period of n×(6+1) and a period of n×(6−1) is preferably applied to the peripheral electrode 120.

In this case, in each of the first electrode 121, the second electrode 122, and the third electrode 123 being the peripheral electrode 120, the duration in which the AC signal has a positive potential and the duration in which the AC signal has a negative potential are equalized, and bias in the polarity of the potential of the peripheral electrode 120 can be eliminated. By eliminating bias in the polarity of the potential of the peripheral electrode 120, ionic impurities attracted toward the peripheral electrode 120 can be swept to the outside of the display region E1 without stagnating.

Moreover, when the AC signal indicated in Example 2 is output from, for example, the driving IC 103, the AC signal in Example 2, which has a maximum potential of +10 V and a minimum potential of −5 V, has a potential width, 10 V−(−5 V)=15 V. Furthermore, estimating 3 V as a circuit margin, the driving IC 103 substantially requires a breakdown voltage of 18 V.

In contrast, in Example 1 and Example 3, 5 V suffices as the amplitude of the COM signal, the amplitude of the driving signal, and the amplitude of the data signal. Even when 3 V is estimated as a circuit margin and added to 5 V, 8 V suffices as the breakdown voltage of the driving IC 103. Thus, power consumption can be reduced to from ⅓ to ¼ of that in Example 2. Also, the driving IC 103 can be reduced in size.

In Example 1 and Example 3 described above, the control signal given to the gate for enabling conduction (ON) or non-conduction (OFF) of the transistor 130 requires an amplitude of from −5 V to 8 V. When the control signal having an amplitude of from −5 V to 8 V is generated directly from the control circuit 114, it is reasonable to embed the control circuit 114 in another IC having high breakdown voltage. Moreover, by providing a level shifter converting an amplitude of from 0 V to 5 V to an amplitude of from −5 V to 8 V on the element substrate 10 of the liquid crystal panel 110, the control circuit 114 can be embedded in the driving IC 103. By providing such a level shifter on the element substrate 10 side, the driving IC 103 can be reduced in size and power consumption as a who.

Second Exemplary Embodiment

Liquid Crystal Device

Figure 12:
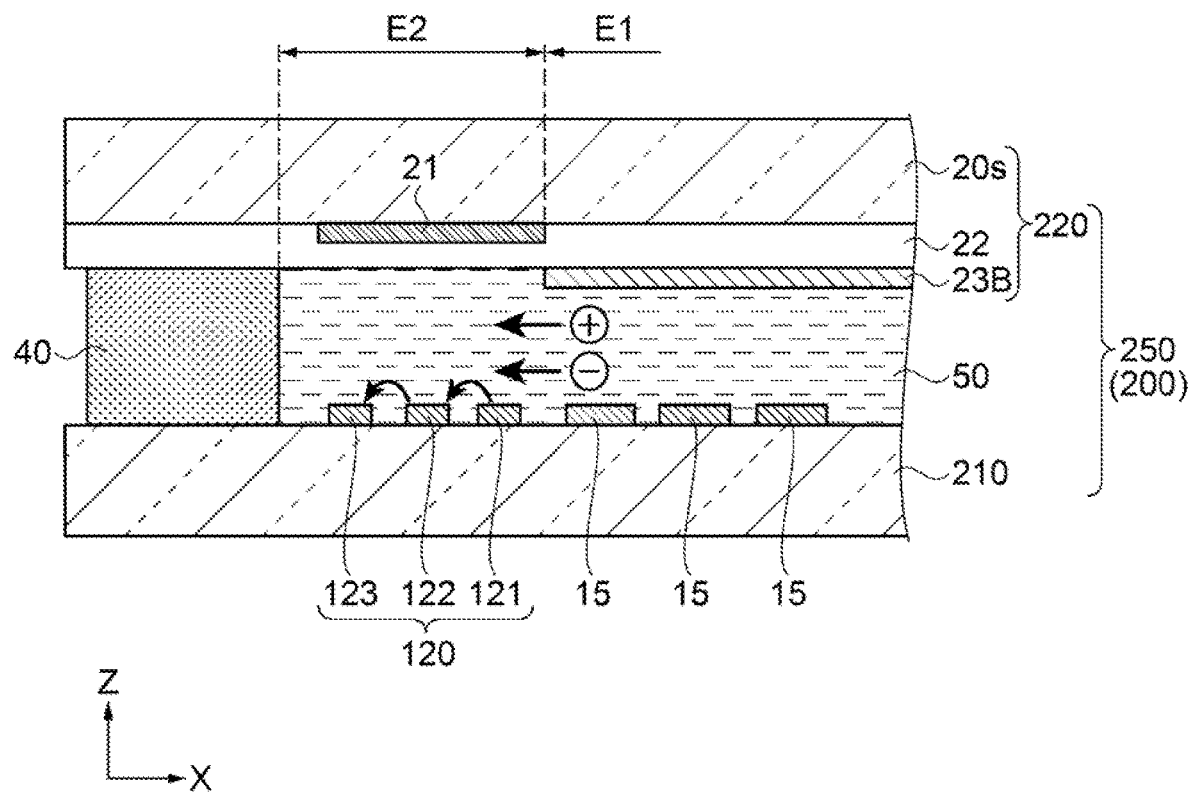
FIG. 12 is a schematic cross-sectional view illustrating the arrangement of a peripheral electrode in an ion trapping mechanism of a liquid crystal device according to a second exemplary embodiment.
Figure 13:
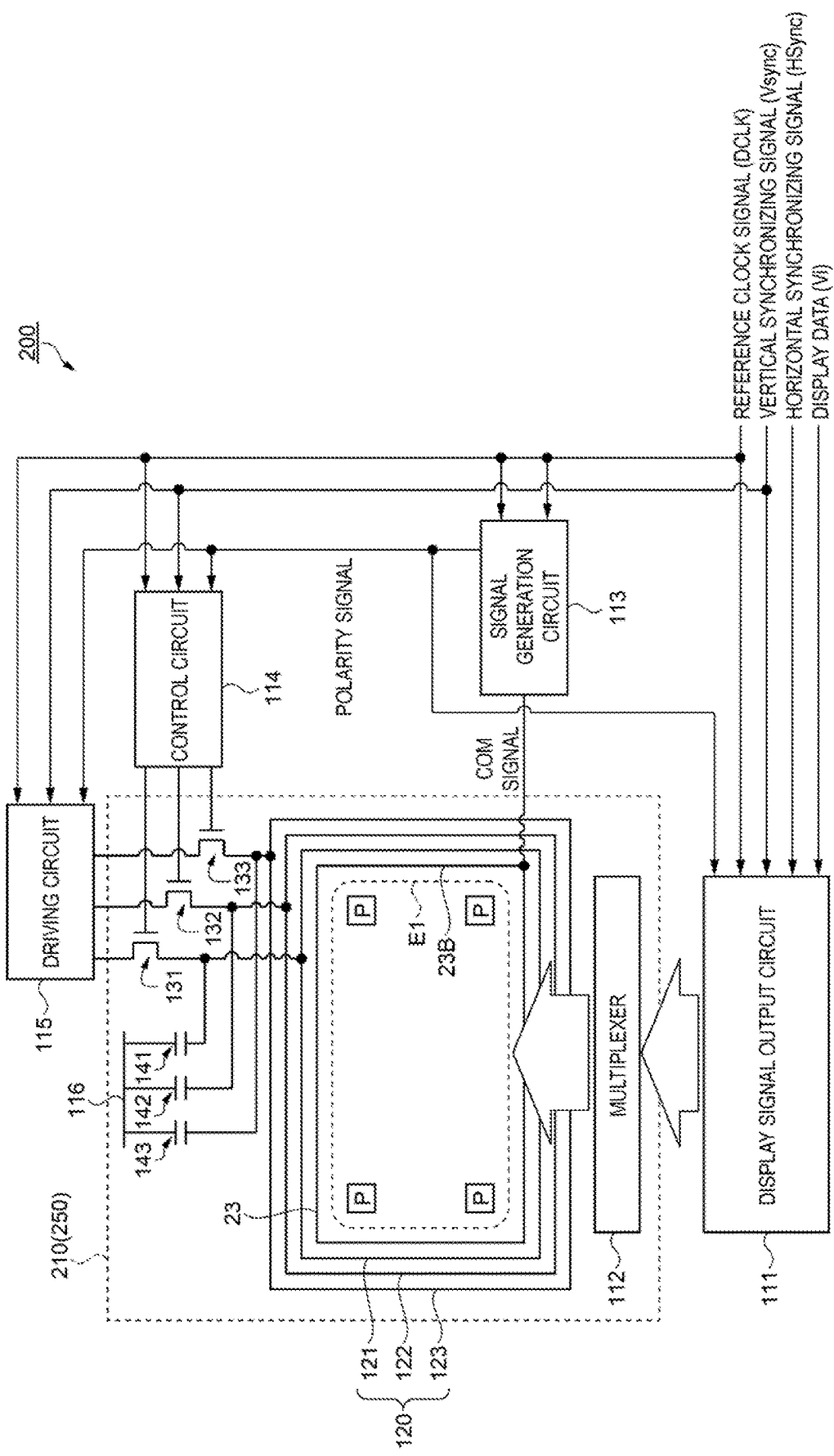
FIG. 13 is a block diagram illustrating the electrical configuration of the liquid crystal device according to the second exemplary embodiment.

Next, a liquid crystal device of a second exemplary embodiment will be described with reference to FIG. 12 and FIG. 13. FIG. 12 is a schematic cross-sectional view illustrating the arrangement of a peripheral electrode in an ion trapping mechanism of the liquid crystal device according to the second exemplary embodiment, and FIG. 13 is a block diagram illustrating an electrical configuration of the liquid crystal device according to the second exemplary embodiment. The liquid crystal device 200 according to the second exemplary embodiment has a partially different electrical configuration of a liquid crystal panel in the ion trapping mechanism from that of the liquid crystal device 100 according to the above-described first exemplary embodiment. Elements that are the same as those in the liquid crystal device 100 of the above described first exemplary embodiment will be given the same reference signs, and their detailed descriptions will be omitted.

As illustrated in FIG. 12, the liquid crystal device 200 according to this exemplary embodiment includes a liquid crystal panel 250 including a liquid crystal layer 50 held between an element substrate 210 and a counter substrate 220 that are disposed to oppose each other with a sealant 40 interposing between the element substrate 210 and the counter substrate 220. In a display region E1 of the element substrate 210, a plurality of pixel electrodes 15 are disposed. Furthermore, in a peripheral region E2 between the display region E1 and the sealant 40, a first electrode 121, a second electrode 122, and a third electrode 123 are disposed in this order from the side closer to the display region E1 at intervals. The first electrode 121, the second electrode 122, and the third electrode 123 function as a peripheral electrode 120 configured for ion trapping.

The counter substrate 220 of the liquid crystal panel 250 includes a base member 20s, a partition portion 21 provided in the peripheral region E2 on the side, closer to the liquid crystal layer 50, of the base member 20s, a planarizing layer 22, and a counter electrode 23B functioning as a common electrode. The counter electrode 23B is provided throughout the entire display region E1 and opposes the plural pixel electrodes 15 of the element substrate 210 with the liquid crystal layer 50 interposed between the counter electrode 23B and the pixel electrodes 15. In the peripheral region E2 outside the display region E1, the counter electrode 23B does not oppose the peripheral electrode 120 of the element substrate 210 with the liquid crystal layer 50 interposed between the counter electrode 23B and the peripheral electrode 120. Note that, in this exemplary embodiment, the element substrate 210 is an example of the first substrate of the present disclosure, and the counter substrate 220 is an example of the second substrate of the present disclosure.

As illustrated in FIG. 13, similar to the liquid crystal device 100 according to the above described first exemplary embodiment, the liquid crystal device 200 according to this exemplary embodiment includes a display signal output circuit 111, a multiplexer 112, a signal generation circuit 113, a control circuit 114, and a driving circuit 115, as circuits relating to driving of the liquid crystal device 200. The liquid crystal panel 250 of the liquid crystal device 200 is provided with a plurality of pixels P in the display region E1. As described above, each of the pixels P is provided with a pixel electrode 15 (see FIG. 2), a TFT 30 (see FIG. 2) being a switching element of the pixel electrode 15, and a holding capacitor (not illustrated) for holding potential applied to the pixel electrode 15. In the peripheral region E2 (see FIG. 12) surrounding the display region E1, the first electrode 121, second electrode 122, and third electrode 123, each of which has a frame shape, are provided to surround the display region E1. As described above, the counter electrode 23B is disposed in the display region E1 to overlap the pixel electrodes 15 of the pixels P in a plan view. The ion trapping mechanism according to this exemplary embodiment includes the peripheral electrode 120 that does not oppose the counter electrode 23B with the liquid crystal layer 50 interposed between the peripheral electrode 120 and the counter electrode 23B.

A first transistor 131 is provided between the first electrode 121 and the driving circuit 115. A second transistor 132 is provided between the second electrode 122 and the driving circuit 115. A third transistor 133 is provided between the third electrode 123 and the driving circuit 115. Each of the gates of the first transistor 131, the second transistor 132, and the third transistor 133 is coupled to the control circuit 114.

A first holding capacitor 141 is provided between a drain, coupled to the first electrode 121 of the first transistor 131, and a wiring line 116 to which a common signal (COM signal) is supplied. A second holding capacitor 142 is provided between a drain, coupled to the second electrode 122 of the second transistor 132, and the wiring line 116. A third holding capacitor 143 is provided between a drain, coupled to the third electrode 123 of the third transistor 133 and the wiring line 116. The first holding capacitor 141, the second holding capacitor 142, and the third holding capacitor 143 may also be referred to simply as three holding capacitors 141, 142, and 143.

The first transistor 131, the second transistor 132, and the third transistor 133 are all constituted by, for example, N-type TFTs. Hereinafter, the first transistor 131, the second transistor 132, and the third transistor 133 may also be referred to collectively as a transistor 130. Alternatively, the first transistor 131, the second transistor 132, and the third transistor 133 may also be referred to as three transistors 131, 132, and 133.

In this exemplary embodiment, the multiplexer 112, these three transistors 131, 132, and 133, the wiring line 116 to which a COM signal is supplied, and the three holding capacitors 141, 142, and 143 are provided on the element substrate 210 of the liquid crystal panel 250. Similar to the liquid crystal device 100 according to the above described first exemplary embodiment, the display signal output circuit 111, the signal generation circuit 113, the control circuit 114, and the driving circuit 115 are included in a driving IC 103 (see FIG. 1) mounted on an FPC 102. Any of the display signal output circuit 111, the signal generation circuit 113, the control circuit 114, and the driving circuit 115, or part of these circuits may be provided on the element substrate 210.

The liquid crystal device 200 is supplied with display data (Vi), a horizontal synchronization signal (Hsync), a vertical synchronization signal (Vsync), and a reference clock signal (DCLK). In addition to these signals, a reference voltage (VSS), a drive voltage (VDD), or the like is supplied to drive the individual circuits described above, although illustration is not given in FIG. 13.

The display data (Vi), the horizontal synchronization signal (Hsync), the vertical synchronization signal (Vsync), and the reference clock signal (DCLK) are input into the display signal output circuit 111. Based on these signals, the display signal output circuit 111 generates a scanning signal (not illustrated in FIG. 13), a data signal, and the like relating to display. The data signal is supplied to each of the pixels P (TFT 30) through the multiplexer 112.

The vertical synchronization signal (Vsync) and the reference clock signal (DCLK) are input into the signal generation circuit 113. Based on these signals, the signal generation circuit 113 generates a common signal (COM signal) and a polarity signal. The COM signal is a signal that varies in a first period between the first potential and the second potential that is smaller than the first potential, and is supplied to the counter electrode 23B. The polarity signal is a logic signal for controlling polarity of an AC signal relating to the driving method for the liquid crystal device 200 that will be described later, and is supplied to each of the display signal output circuit 111, the control circuit 114, and the driving circuit 115.

The vertical synchronization signal (Vsync), the reference clock signal (DCLK), and the polarity signal are input into the control circuit 114. Based on these signals, the control circuit 114 generates a control signal relating to switching control (couple/uncouple) of the first transistor 131, the second transistor 132, and the third transistor 133.

The vertical synchronization signal (Vsync), the reference clock signal (DCLK), and the polarity signal are input into the driving circuit 115. Based on these signals, the driving circuit 115 generates a driving signal for each of the first transistor 131, the second transistor 132, and the third transistor 133. The driving signal is a signal relating to the driving method for the liquid crystal device 200 that will be described later, and is a signal that varies between the third potential and the fourth potential that is smaller than the third potential.

The driving signal generated by the driving circuit 115 is supplied through the first transistor 131, the second transistor 132, and the third transistor 133 to the first electrode 121, the second electrode 122, and the third electrode 123, respectively, of the peripheral electrode 120 in a state where phases are shifted from each other. In other words, the driving circuit 115 generates driving signals to be applied to each of the three electrodes 121, 122, and 123 configured for ion trapping, the driving signals having the same frequency, the driving signals being signals of which phases are shifted from each other. Furthermore, the potential of the driving signals is maintained in a duration determined by the control signal, which will be described later, by the first holding capacitor 141, the second holding capacitor 142, and the third holding capacitor 143 provided respectively between the first transistor 131, the second transistor 132, and the third transistor 133 and the wiring line 116.

Driving Method for Liquid Crystal Device

In the driving method for the liquid crystal device 200 according to this exemplary embodiment, the common signal (COM signal) that varies its potential between the first potential and the second potential that is smaller than the first potential in the first period is given to the counter electrode 23B functioning as the common electrode of the counter substrate 220, the driving signal that varies its potential between the third potential and the fourth potential that is smaller than the third potential is input to the transistor 130 being the switching element, the transistor 130 couples or uncouples the driving signal to each of the first electrode 121, the second electrode 122, and the third electrode 123 being the peripheral electrode 120 configured for ion trapping in a unit of a duration equal to or less than ½ of the first period of the COM signal, and the AC signals having mutually different phases and that varies their potential between a positive potential and a negative potential, taking the potential of the common signal (COM signal) as a reference, in the second periods longer than the first period are applied to the first electrode 121, the second electrode 122, and the third electrode 123. The potential of the AC signals applied to the first electrode 121, the second electrode 122, and the third electrode 123 is maintained by the first holding capacitor 141, the second holding capacitor 142, and the third holding capacitor 143. A specific driving method for the liquid crystal device of Example 4 will be described below.

EXAMPLE 4

Figure 14:
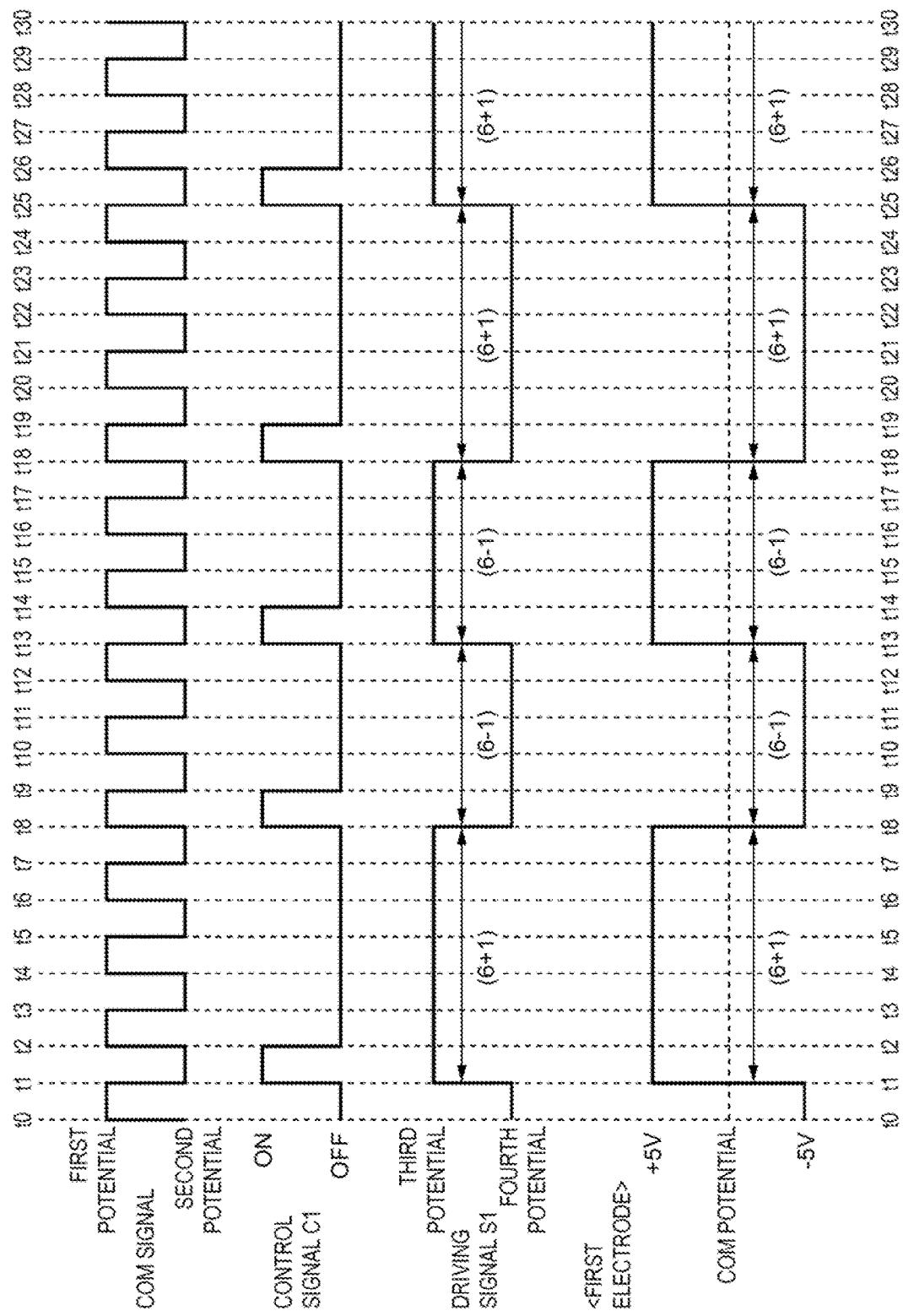
FIG. 14 is a timing chart illustrating a common signal, a control signal, a driving signal, and an AC signal according to an Example 4, in a driving method for a liquid crystal device according to the second exemplary embodiment.

FIG. 14 is a timing chart illustrating the common signal, the control signal, the driving signal, and the AC signal in the driving method for the liquid crystal device according to Example 4. Note that the control signal, the driving signal, and the AC signal in FIG. 14 are corresponding to the first electrode 121 of the peripheral electrode 120. The driving method for the liquid crystal device of Example 4 differs from the driving method for the liquid crystal device of Example 3 in terms of the form of the control signal.

As illustrated in FIG. 14, similar to Example 1 described above, the common signal (COM signal) in the driving method for the liquid crystal device of Example 4 is a signal that varies between the first potential (5 V) and the second potential (0 V) that is smaller than the first potential in the first period. The first period is 8.4 milliseconds (ms) as with the COM signal according to Example 1. In other words, the frequency of the COM signal is 120 Hz.

Similar to Example 3 described above, the driving signal S1 stays at the fourth potential (0 V) between time t0 and time t1, varies at the time t1 from the fourth potential (0 V) to the third potential (5 V), and is maintained at the third potential (5 V) between time t1 and time t8. In addition, the driving signal S1 varies at time t8 from the third potential (5 V) to the fourth potential (0 V), and is maintained at the fourth potential (0 V) between time t8 and time t13. The driving signal S1 varies at time t13 from the fourth potential (0 V) to the third potential (5 V), and is maintained at the third potential (5 V) between time t13 and time t18. Furthermore, the driving signal S1 varies at time t18 from the third potential (5 V) to the fourth potential (0 V), and is maintained at the fourth potential (0 V) between time t18 and time t25. That is, the period of the driving signal S1 is six times the first period of the COM signal, and the duration in which the third potential (5 V) is maintained and the duration in which the fourth potential (0 V) is maintained have the same length in a duration being double of the period of the driving signal S1. In this case, the duration in which the third potential (5 V) is maintained and the duration in which the fourth potential (0 V) is maintained are each equal to 12 vertical durations of the COM signal. Note that, in Example 4, as the period of the driving signal S1, an integer (multiple (n times) of six of first period of the COM signal suffices.

In relation to this driving signal S1, the control signal C1 relating to ON/OFF control of the first transistor 131 coupled to the first electrode 121 in Example 4 is in an ON state from time t1 to time t2 in which the COM signal has the second potential (0 V) and the driving signal S1 has the third potential (5 V), and is in an ON state from time t8 to time t9 in which the COM signal has the first potential (5 V) and the driving signal S1 has the fourth potential (0 V). Then, the control signal C1 is in an ON state from time t13 to time t14 in which the COM signal has the second potential (0 V) and the driving signal S1 has the third potential (5 V), and is in an ON state from time t18 to time t19 in which the COM signal has the first potential (5 V) and the driving signal S1 has the fourth potential (0 V). Furthermore, the control signal C1 is in an ON state from time t25 to time t26 in which the COM signal has the second potential (0 V) and the driving signal S1 has the third potential (5V). That is, at the timing when the potential of the driving signal S1 varies from the fourth potential (0 V) to the third potential (5 V) or at the timing when the potential of the driving signal S1 varies from the third potential (5 V) to the fourth potential (0 V), the control signal C1 is turned to an ON state, and, in the duration in which the fourth potential (0 V) or the third potential (5 V) is maintained, the control signal C1 is in an OFF state.

Thus, in Example 4, in (6+1) vertical durations or (6−1) vertical durations of the COM signal, the control signal C1 is in an ON state once, and the driving signal S1 is applied to the first electrode 121 though the first transistor 131. That is, the duration in which the driving signal S1 is applied to the first electrode 121 is shorter than that in Example 1 or Example 3 described above. However, the liquid crystal device 200 according to this exemplary embodiment, the first holding capacitor 141 is provided between the drain, coupled to the first electrode 121 of the first transistor 131 and the wiring line 116 to which the COM signal is supplied, and thus the potential of the first electrode 121, when the driving signal S1 is applied, is held by the first holding capacitor 141.

Accordingly, as illustrated in FIG. 14, the potential of the first electrode 121 with respect to the COM potential is a positive potential (+5 V) from time t1 to time t8, a negative potential (−5 V) from time t8 to time t13, the positive potential (+5 V) from time t13 to time t18, and the negative potential (−5 V) from time t18 to time t25. That is, the first electrode 121 is applied with the AC signal that varies its potential between the positive potential (+5 V) and the negative potential (−5 V), taking the COM potential as a reference, in the second period longer than the first period of the COM signal. Furthermore, in a duration of double periods of the AC signal, the duration in which the first electrode 121 has a positive potential and the duration in which the first electrode 121 has a negative duration have the same length. That is, bias in the polarity of the potential of the first electrode 121 when the AC signal is applied is resolved. Note that, when the number of the electrodes configured for ion trapping is three, an integer multiple (n times) of 6 suffices as the period of the driving signal S1. Furthermore, the second electrode 122 and the third electrode 123 of the peripheral electrode 120 are applied with AC signals having mutually different phases shifted by ⅓ period from that of the AC signal applied to the first electrode 121.

According to the liquid crystal device 200 and the driving method for the liquid crystal device 200 of Example 4, the holding capacitor corresponding to each of the three electrodes 121, 122, and 123 of the peripheral electrode 120 is provided between each of the three electrodes 121, 122, and 123 and the wiring line 116 to which the COM signal is supplied, without the liquid crystal capacitor configured in correspondence to the peripheral electrode 120 as in Example 1 to Example 3. Accordingly, the holding capacitor can have an electric capacitance greater than that of the liquid crystal capacitor. Thus, even when the control signal is in an ON state (a state in which the transistor 130 is coupled) in a shorter duration, the potential of each of the three electrodes 121, 122, and 123 of the peripheral electrode 120 when the driving signal is supplied is maintained. That is, duration in which the driving signal is applied to the peripheral electrode 120 configured for ion trapping is substantially reduced, and thus power consumption when Ion-Surf driving and common inversion driving are combined can be reduced in comparison to Example 1 or Example 3.

EXAMPLE 5

Figure 15:
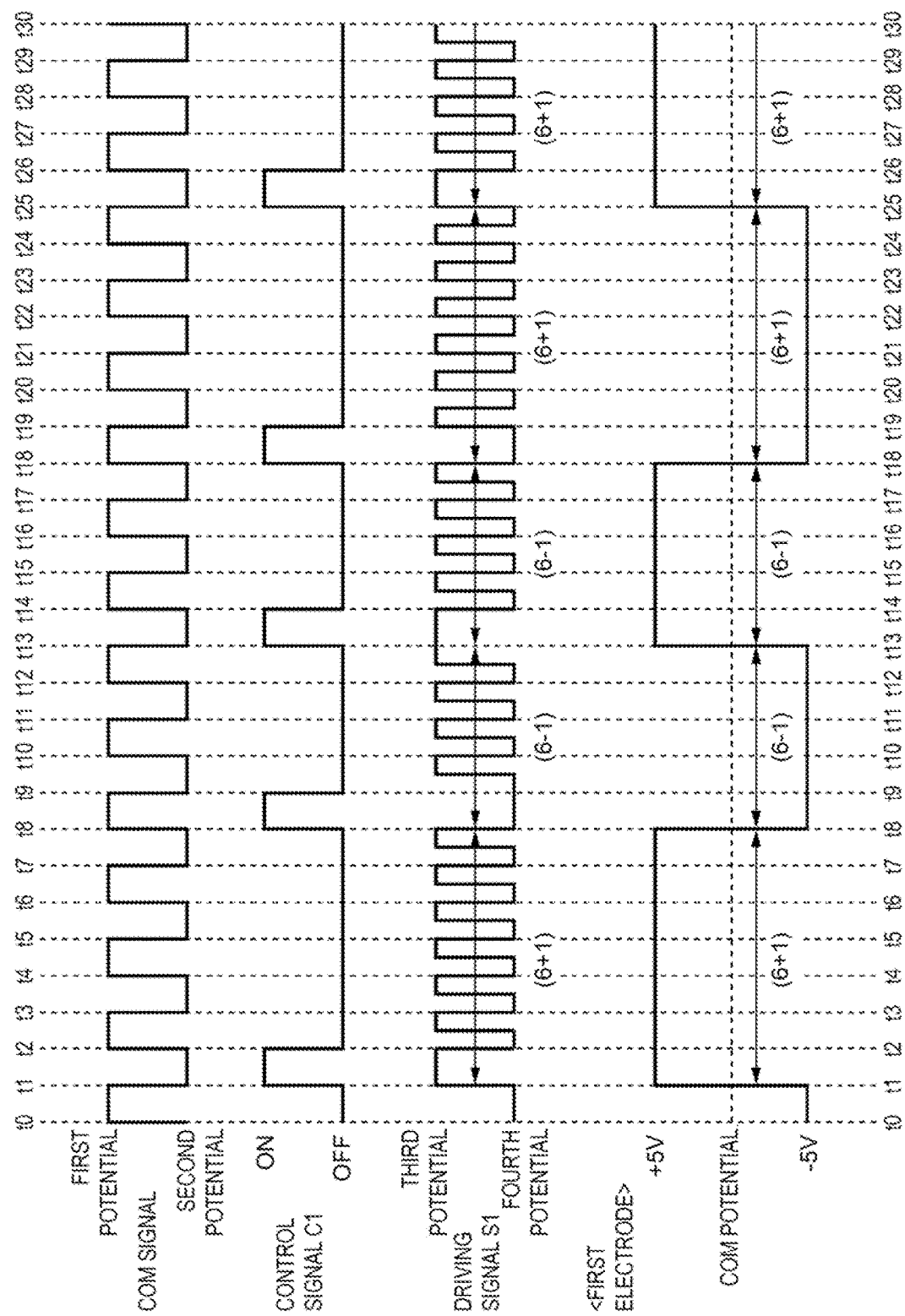
FIG. 15 is a timing chart illustrating a common signal, a control signal, a driving signal, and an AC signal according to an Example 5, in the driving method for a liquid crystal device according to the second exemplary embodiment.

FIG. 15 is a timing chart illustrating the common signal, the control signal, the driving signal, and the AC signal according to a driving method for the liquid crystal device of Example 5. Note that the control signal, the driving signal, and the AC signal in FIG. 15 are for the first electrode 121 of the peripheral electrode 120. The driving method for the liquid crystal device according to Example 5 differs from the driving method for the liquid crystal device according to Example 4 in terms of the form of the driving signal.

As illustrated in FIG. 13, the liquid crystal device 200 according to the second exemplary embodiment is provided with the first holding capacitor 141 between the first electrode 121 of the peripheral electrode 120 configured for ion trapping and the wiring line 116 to which the COM potential is supplied. Similarly, the second holding capacitor 142 is provided between the second electrode 122 and the wiring line 116, and the third holding capacitor 143 is provided between the third electrode 123 and the wiring line 116. Thus, as described in Example 4, even if the control signal is in an OFF state, the potential of the driving signal applied to each of the three electrodes 121, 122, and 123 through the transistor 130, when the control signal is in an ON state, is respectively maintained by the corresponding three holding capacitors 141, 142, and 143.

Accordingly, to apply the three electrodes 121, 122, and 123 with the AC signals having the same frequency, shifted in phase from each other, and that varies their potential between a positive potential and a negative potential, taking the COM potential as a reference, in the second period longer than the first period, it is only required to have the predetermined potential being maintained by supplying the driving signal to each of the three electrodes 121, 122, and 123 when the control signal is in an ON state. In other words, the potential of the driving signal in the duration in which the control signal is in an OFF state is not limited to being maintained at certain potential (the third potential or the fourth potential) as indicated in Example 4. The driving method for the liquid crystal device according to Example 5 indicates another example of the driving signal when the control signal is in an OFF state.

As illustrated in FIG. 15, similar to Example 1 described above, the common signal (COM signal), in the driving method for the liquid crystal device according to Example 5, is a signal that varies between the first potential (5 V) and the second potential (0 V) that is smaller than the first potential in the first period. The first period is 8.4 milliseconds (ms) as with the COM signal according to Example 1. In other words, the frequency of the COM signal is 120 Hz.

The driving signal S1 in Example 5 varies from the fourth potential (0 V) to the third potential (5 V) and is maintained at the third potential (5 V) in the duration from time t1 to time t2 in which the control signal C1 is in an ON state. The driving signal S1 periodically varies between the fourth potential (0 V) and the third potential (5 V), in a unit of a duration equal to ¼ of the first period of the COM signal, between time t2 and time t8 in which the control signal C1 is in an OFF state. The driving signal S1 varies from the third potential (5 V) to the fourth potential (0 V) and is maintained at the fourth potential (0 V) between time t8 and time t9 in which the control signal C1 is in an ON state again. Then, the driving signal S1 periodically varies between the fourth potential (0 V) and the third potential (5 V), in a unit of a duration equal to ¼ of the first period of the COM signal, between time t9 and time t13 in which the control signal C1 is in an OFF state again. Next, the driving signal S1 is maintained at the third potential (5 V) between time t13 and time t14 in which the control signal C1 is in an ON state. Then, the driving signal S1 periodically varies between the fourth potential (0 V) and the third potential (5 V), in a unit of a duration equal to ¼ of the first period of the COM signal, between time t14 to time t18 in which the control signal C1 is in an OFF state. Next, the driving signal S1 varies from the third potential (5 V) to the fourth potential (0 V) and is maintained at the fourth potential (0 V) between time t18 and time t19 in which the control signal C1 is in an ON state again. Then, the driving signal S1 periodically varies between the fourth potential (0 V) and the third potential (5 V), in a unit of a duration equal to ¼ of the first period of the COM signal, between time t19 and time t25 in which the control signal C1 is in an OFF state again. After that, the above-described periodical varying in potential of the driving signal S1 is repeated in correspondence to the period having (6+1) vertical durations and the period having (6−1) vertical durations, of the COM signal.

The COM signal has the second potential (0 V) and the driving signal S1 has the third potential (5 V) from time t1 to time t2 in which the control signal C1 is in an ON state, then the potential of the first electrode 121 with respect to the COM potential is +5 V, which is positive, and is maintained at +5 V in the duration from time t2 to time t8 in which the control signal C1 is in an OFF state. The COM signal has the first potential (5 V) and the driving signal S1 has the fourth potential (0 V) from time t8 to time t9 in which the control signal C1 is in an ON state again, then the potential of the first electrode 121 with respect to the COM potential is −5 V, which is negative, and is maintained at −5 V in the duration from time t9 to time t13 in which the control signal C1 is in an OFF state. Next, the COM signal has the second potential (0 V) and the driving signal S1 has the third potential (5 V) from time t13 to time t14 in which the control signal C1 is in an ON state, then the potential of the first electrode 121 with respect to the COM potential is +5 V, which is positive, and is maintained at +5 V in the duration from time t14 to time t18 in which the control signal C1 is in an OFF state. The COM signal has the first potential (5V) and the driving signal S1 has the fourth potential (0 V) from time t18 to time t19 in which the control signal C1 is in an ON state again, then the potential of the first electrode 121 with respect to the COM potential is −5 V, which is negative, and is maintained at −5 V in the duration from time t19 to time t25 in which the control signal C1 is in an OFF state. After that, the periodical varying in potential of the AC signal for the first electrode 121 is repeated in correspondence to the potential of the COM signal and the potential of the driving signal S1.

In summary, as illustrated in FIG. 15, the potential of the first electrode 121 with respect to the COM potential is the positive potential (+5 V) from time t1 to time t8, the negative potential (−5 V) from time t8 to time t13, the positive potential (+5 V) from time t13 to time t18, and the negative potential (−5 V) from time t18 to time t25. That is, the first electrode 121 is applied with the AC signal that varies between the positive potential (+5 V) and the negative potential (−5 V), taking the COM potential as a reference, in the second period longer than the first period of the COM signal. Furthermore, in a duration of double period of the AC signal, the duration in which the first electrode 121 has a positive potential and the duration in which the first electrode 121 has a negative duration have the same length. That is, bias in the polarity of the potential of the first electrode 121 when the AC signal is applied is resolved. Note that, when the number of the electrodes configured for ion trapping is three, an integer multiple (n times) of 6 suffices as the period of the driving signal S1. Furthermore, the second electrode 122 and the third electrode 123 of the peripheral electrode 120 are applied with AC signals having mutually different phases shifted by ⅓ period from that of the AC signal applied to the first electrode 121.

The electric capacitance of the three holding capacitors 141, 142, and 143 achieving such methods for driving the liquid crystal device of Example 4 and Example 5 is preferably 10 times or greater than the fringe capacitance between adjacent electrodes of the peripheral electrode 120, and more preferably, 50 times or greater. In specific, when the aforementioned fringe capacitance is 2 picofarads (pF), the aforementioned electric capacitance is preferably 20 pF or greater, and more preferably, 100 pF or greater.

Furthermore, in the second exemplary embodiment, the counter electrode 23B does not oppose the peripheral electrode 120 with the liquid crystal layer 50 interposed between the counter electrode 23B and the peripheral electrode 120, and it is thus difficult for an electric field to be generated between the peripheral electrode 120 and the counter electrode 23B. Accordingly, by the scrolling of electric field through Ion-Surf driving of the peripheral electrode 120, ionic impurities can be effectively swept from the display region E1 to the outside.

Note that, similar to Example 1 and Example 3 of the liquid crystal device 100 according to the above described first exemplary embodiment, in the liquid crystal device 200 according to the second exemplary embodiment, the transistor 130 may be in a coupled state in all the first duration in which the COM signal has the first potential (for example, 5 V) and the AC signal has the negative potential (−5 V) or in all the second duration in which the COM signal has the second potential (for example, 0 V) and the AC signal has the positive potential (+5 V).

Frequency (Second Period) of AC Signal

Next, the frequency (second period) of the AC signal applied to the peripheral electrode 120 will be described.

In Example 1 and Example 3 according to the above described first exemplary embodiment and Example 4 and Example 5 according to the above described second exemplary embodiment, the period of the driving signal and the AC signal are six times as long as the first period of the COM signal. This setting is provided to intelligibly illustrate the driving signal and the AC signal.

To ensure that ionic impurities are swept toward the third electrode 123 by the scrolling of electric field generated around the peripheral electrode 120 including the three electrodes 121, 122, and 123 configured for ion trapping, the frequency of the AC signal needs to be determined in consideration of the moving speed of the ionic impurities. When the speed of the scrolling of electric field is faster than the moving speed of ionic impurities, the ionic impurities may not keep up with the scrolling of electric field, and the effect of sweeping the ionic impurities may be decreased.

A preferable frequency f (Hz) of the AC signals in the ion trapping mechanism including the peripheral electrode 120 and the like according to the above described exemplary embodiments is obtained in the following manner.

The moving speed v (m/s (second)) of ionic impurities in the liquid crystal layer 50 is given as the product of the electric field strength e (V/m) between adjacent electrodes configured for ion trapping and the mobility μ (m$^2$/V·s (second)) of the ionic impurities as represented by equation (1).

$$\text{That is, } v = e \times \mu \tag{1}$$

The electric field strength e (V/m) is a value obtained by dividing the potential difference Vn between adjacent electrodes configured for ion trapping by the arrangement pitch p (m) of the electrodes configured for ion trapping as represented by equation (2).

$$\text{That is, } e = Vn/p \tag{2}$$

The potential difference Vn between adjacent electrodes configured for ion trapping is equivalent to double the effective voltage VE of the AC signals, and thus the following equation (3) is derived.

$$\text{That is, } e = 2VE/p \tag{3}$$

Note that, as in Example 1 illustrated in FIG. 8, the effective voltage VE of the AC signals having rectangular waves is equivalent to the potential with respect to the COM potential having a rectangular wave, and is 5 V.

By inserting equation (3) into equation (1), the moving speed v (m/s) of the ionic impurities is represented by equation (4).

$$\text{That is, } v = 2\mu VE/p \tag{4}$$

The time td of the ionic impurities moving between adjacent electrodes configured for ion trapping is a value obtained by dividing the arrangement pitch p of adjacent electrodes configured for ion trapping by the moving speed v of the ionic impurities as represented by equation (5).

$$\text{That is, } td = p/v = p^2/2\mu VE \tag{5}$$

Thus, a preferable frequency f (Hz) is obtained by the scrolling of electric field in accordance with the time td of the ionic impurities moving between adjacent electrodes configured for ion trapping. The time of the scrolling of electric field is equivalent to the difference Δt in phase between the AC signals, and when Δt is 1/n period, a preferable frequency f (Hz) is derived from the following equation (6). That is, $$f = 1/n/td = 2\mu VE/np^2 \quad (6)$$

where n is the number of the electrodes configured for ion trapping.

When the difference Δt in phase between the AC signals applied to adjacent electrodes configured for ion trapping is ⅓ period as described in Examples 1, 2, 3, 4, and 5 above, when the AC signals having rectangular waves transition between +5 V and −5 V, taking the COM potential as a reference, the potential difference Vn between adjacent electrodes configured for ion trapping is 10 V. Furthermore, when the arrangement pitch p of the electrodes configured for ion trapping is, for example, 8 μm and the mobility μ of the ionic impurities is $2.2 \times 10^{-10}$ (m²/V·s), a preferable frequency f is approximately 12 Hz according to equation (6).

Note that the value of the mobility μ of ionic impurities is described in, for example, A. Sawada, A. Manabe and S. Naemura, "A Comparative Study on the Attributes of Ions in Nematic and Isotropic Phases", Jpn. J. Appl Phys Vol. 40, p 220-p 224 (2001). It is also confirmed that ionic impurities having mobility μ that is approximately three orders of magnitude smaller may exist depending on the liquid crystal material or the configuration of the liquid crystal panel.

When the mobility μ of the ionic impurities contained in the liquid crystal layer 50 has a value of $2.2 \times 10^{-10}$ (m²/V·s) as described above, a frequency f of the AC signals of higher than 12 Hz causes the ionic impurities not to keep up with the scrolling of electric field, and thus the frequency f is preferably smaller than 12 Hz.

Moreover, when the mobility μ of the ionic impurities contained in the liquid crystal layer 50 has a smaller value of $2.2 \times 10^{-13}$ (m²/V·s) as described above, a frequency f of the AC signals of higher than 12 mHz causes the ionic impurities not to keep up with the scrolling of electric field, and thus the frequency f is preferably smaller than 12 mHz. Accordingly, the frequency f is desirably determined in accordance with the value of the mobility μ of the ionic impurities. However, to enable general versatility, it is more desirable to set the frequency f by corresponding for ionic impurities having a minimum value of the expected mobility μ. This more desirable frequency f in this example is 12 mHz.

Moreover, a too low frequency f causes direct current to be applied to the electrodes configured for ion trapping and thus causes, for example, decomposition of liquid crystal or a display defect such as burn-in or a stain, which is not preferable. An arrangement pitch of the electrodes configured for ion trapping of smaller than 8 μm can increase the preferable frequency f. Based on this, the number of the electrodes configured for ion trapping may be increased from three to sweep ionic impurities even farther from the display region E1.

Moreover, when L represent the width of the electrodes configured for ion trapping and S represent the gap between the electrodes, the width L is preferably same as the gap S or less than the gap S. This is because a width L greater than the gap S causes the time of ionic impurities moving on the electrodes, where electric field is difficult to move, to be longer than the time of ionic impurities moving between the electrode by movement of electric field between the electrodes, and thus the effect of sweeping ionic impurities may be decreased.

In each of the above-described exemplary embodiments, to achieve low power consumption by combining the above-described Ion-Surf driving and common inversion driving, and to effectively sweep ionic impurities from the display region E1 to the outside, when the common signal (COM signal) has a frequency of 60 Hz to 240 Hz, the AC signals preferably have a frequency of 0.1 mHz to 5 mHz that is smaller than 12 mHz obtained in consideration of the above-described value of the mobility μ of the ionic impurities. Note that, when the common signal (COM signal) has a frequency of 60 Hz, the first period is 16.7 milliseconds (ms), and when the common signal has a frequency of 240 Hz, the first period is 4.2 milliseconds (ms). On the other hand, when the AC signal has a frequency of 0.1 mHz, the second period is 10000 seconds, and when AC signal has a frequency of 5 mHz, the second period is 200 seconds.

In each of the above-described exemplary embodiments, the three electrodes 121, 122, and 123 (peripheral electrode 120) configured for ion trapping are preferably disposed to have frame shapes (ring shapes) surrounding the display region E1. With this configuration, regardless of alignment control of the liquid crystal molecules LC, ionic impurities, which enter the liquid crystal layer 50 from different directions and diffuse, can be swept to the outside of the display region E1.

Third Exemplary Embodiment

Electronic Apparatus

Figure 16:
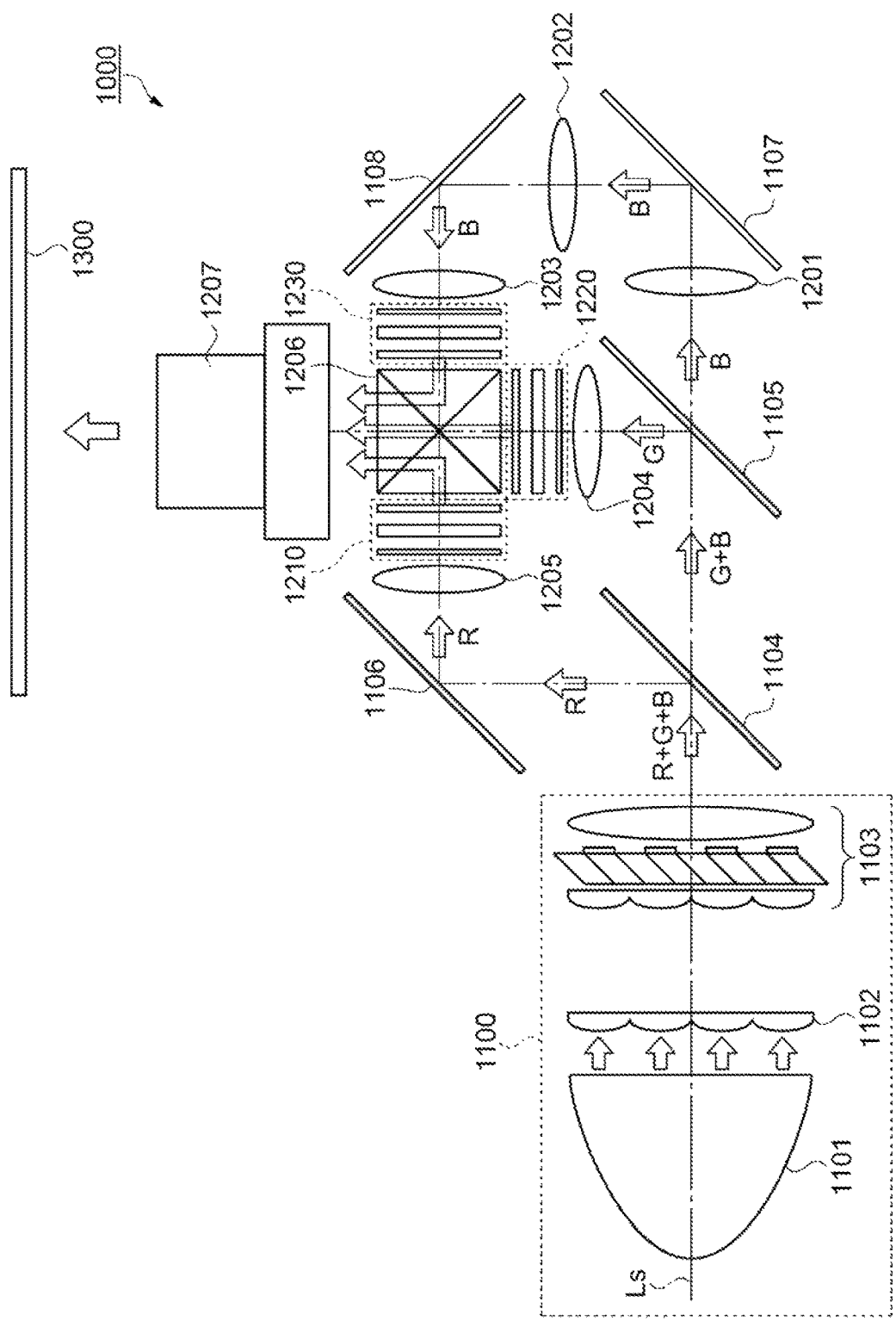
FIG. 16 is a schematic view illustrating the configuration of a projection-type display device as an electronic apparatus according to a third exemplary embodiment.

Next, a projection-type display device will be described with reference to FIG. 16 as an example of an electronic apparatus according to this exemplary embodiment, to which the liquid crystal device is applied. FIG. 16 is a schematic view illustrating a configuration of the projection-type display device as an electronic apparatus according to the third exemplary embodiment.

As illustrated in FIG. 16, the projection-type display device 1000 as an electronic apparatus according to this exemplary embodiment includes a polarized light illumination device 1100 disposed along a system optical axis Ls, two dichroic mirrors 1104 and 1105 as light separation elements, three reflection mirrors 1106, 1107, and 1108, five relay lenses 1201, 1202, 1203, 1204, and 1205, three transmission-type liquid crystal light valves 1210, 1220, and 1230 as light modulation units, across dichroic prism 1206 as a light synthesizing element, and a projection lens 1207.

The polarized light illumination device 1100 schematically includes a lamp unit 1101 as a light source including a white light source such as an extra-high pressure mercury lamp or a halogen lamp, an integrator lens 1102, and a polarization conversion element 1103.

The dichroic mirror 1104 reflects red light (R) of a polarized light flux emitted from the polarized light illumination device 1100 and transmits green light (G) and blue light (B). The other dichroic mirror 1105 reflects the green light (G) transmitted by the dichroic mirror 1104 and transmits the blue light (B).

The red light (R) reflected by the dichroic mirror 1104 is reflected by the reflection mirror 1106 and subsequently is incident on the liquid crystal light valve 1210 via the relay lens 1205.

The green light (G) reflected by the dichroic mirror 1105 is incident on the liquid crystal light valve 1220 via the relay lens 1204.

The blue light (B) transmitted by the dichroic mirror 1105 is incident on the liquid crystal light valve 1230 via a light guide system including three relay lenses 1201, 1202, and 1203 and two reflection mirrors 1107 and 1108.

The liquid crystal light valves 1210, 1220, and 1230 are each disposed to face an incident surface of each type of color light of the cross dichroic prism 1206. The color light incident on the liquid crystal light valves 1210, 1220, and 1230 is modulated based on video information (video signal) and is emitted toward the cross dichroic prism 1206. In this prism, four rectangular prisms are bonded together, and on inner surfaces of the prisms, a dielectric multilayer film configured to reflect red light and a dielectric multilayer film configured to reflect blue light are formed in a cross shape. Three types of color light are synthesized by these dielectric multilayer films, and light representing a color image is synthesized. The synthesized light is projected onto a screen 1300 by the projection lens 1207 as a projection optical system, and an image is enlarged and displayed.

The liquid crystal light valve 1210 is a light valve to which the liquid crystal device 100 according to the first exemplary embodiment including the above described ion trapping mechanism is applied. A pair of light-polarizing elements disposed in a crossed-Nicols state on the incident side and the emission side of the color light of the liquid crystal panel 110 are disposed with a gap interposed between the pair of light-polarizing elements. The same applies to the other liquid crystal light valves 1220 and 1230.

According to this projection-type display apparatus 1000, the above-described liquid crystal device 100 is used as the liquid crystal light valves 1210, 1220, and 1230. Thus, the projection-type display apparatus 1000 can be provided that can be reduced in power consumption, can be improved in terms of a display problem due to ionic impurities, and can maintain excellent display quality over a long period. Note that, even when the liquid crystal device 200 according to the above described second exemplary embodiment is used as the liquid crystal light valves 1210, 1220, and 1230, effects similar to these effects are achieved.

Note that the disclosure is not limited to the exemplary embodiment described above, and the exemplary embodiment described above can be variously changed and modified. Such modified examples are described below.

MODIFIED EXAMPLE 1

In the ion trapping mechanism according to the above described exemplary embodiments, each of the three electrodes 121, 122, and 123 configured for ion trapping is not limited to being disposed to have a frame shape surrounding the display region E1. As illustrated in FIG. 4, when ionic impurities are located unevenly in a limited position (the lower left corner and the upper right corner of the display region E1 in FIG. 4) in accordance with a method of alignment control of the liquid crystal molecules LC, the at least three electrodes 121, 122, and 123 configured for ion trapping may be disposed in different positions at different intervals from the display region E1 and at intervals between each other in correspondence to the position where ionic impurities are located unevenly. In other words, the at least three electrodes 121, 122, and 123 configured for ion trapping may be disposed in different positions at different distances from the display region E1 and at distances between each other in correspondence to the position where ionic impurities are located unevenly.

MODIFIED EXAMPLE 2

The liquid crystal device 100 or the liquid crystal device 200 to which the ion trapping mechanism according to the above-described exemplary embodiments is applied is not limited to being of transmission type, and the ion trapping mechanism can also be applied to a reflection-type liquid crystal device in which pixel electrodes 15 are configured by electrically conducting films having light reflection properties.

MODIFIED EXAMPLE 3

The electronic apparatus to which the liquid crystal device 100 or 200 according to the above described exemplary embodiments can be applied is not limited to the projection-type display device 1000 of the third exemplary embodiment. For example, by being configured to have a color filter including a pigmented layer in each of pixels as a liquid crystal device, the electronic apparatus can be used suitably as a display unit of a projection-type head-up display (HUD), a direct view-type head-mounted display (HMD), an electronic book, a personal computer, a digital still camera, a liquid crystal television, a view finder-type or monitor direct view-type video recorder, a car navigation system, an electronic diary, an information terminal device such as a POS terminal, or the like.

The contents derived from the exemplary embodiments described above will be described below.

A liquid crystal device according to an aspect of the present disclosure is a liquid crystal device including an electro-optical material held between a pair of substrates opposing mutually with a sealant interposed therebetween, the liquid crystal device including, a pixel electrode disposed in a display region of the liquid crystal device, a common electrode disposed opposing the pixel electrode, a first electrode disposed between the display region and the sealant, a second electrode disposed between the first electrode and the sealant, and a third electrode disposed between the second electrode and the sealant. A common signal varying between a first potential and a second potential, which is lower than the first potential, in a first period is supplied to the common electrode, a first AC signal varying in a second period, which is different from the first period, is supplied to the first electrode, a second AC signal having a phase different from that of the first AC signal is supplied to the second electrode, and a third AC signal having a phase different from those of the first AC signal and the second AC signal is supplied to the third electrode.

According to the configuration of this aspect, the common electrode, to which is supplied the common signal that varies between the first potential and the second potential being lower than the first potential in the first period, is included, and thus common inversion driving can be carried out, which makes it possible to suppress a drop in display quality caused by degradation of the liquid crystal material. Furthermore, AC signals having different phases are supplied to the first electrode, the second electrode, and the third electrode, which makes it possible to sweep ionic impurities in the display region to outside the display region and suppress display unevenness. Additionally, the first electrode, the second electrode, and the third electrode are not provided with switching circuits, and thus the cost can be suppressed.

In the above-described liquid crystal device, the second period is preferably longer than the first period.

According to this configuration, the second period is longer than the first period, and thus common inversion driving can be carried out when AC signals that vary in the second period are supplied to the first electrode, the second electrode, and the third electrode at shifted phases. Additionally, an electrical field can be caused to move from the display region toward a region on the outer side, which makes it possible to sweep ionic impurities from the display region to the region on the outer side.

A liquid crystal device according to an aspect of the present disclosure includes, a first substrate in which a plurality of pixel electrodes are arranged in a display region, a second substrate in which a common electrode is disposed, the common electrode being supplied with a common signal potential varying between a first potential and a second potential, which is lower than the first potential, in a first period, a liquid crystal layer held between the first substrate and the second substrate opposing mutually with a sealant interposed therebetween, at least three electrodes opposing the common electrode via the liquid crystal layer, the at least three electrodes being disposed between the display region of the first substrate and the sealant at different intervals from the display region, and a switching element coupled to each of the at least three electrodes. A driving signal varying between a third potential and a fourth potential lower than the third potential is input to the switching element, in units of durations equal to or less than ½ of the first period, and AC signals varying between a positive-polarity potential and a negative-polarity potential, with a potential of the common signal being a reference, in a second period, which is longer than the first period, are applied to the at least three electrodes in a state where phases of the AC signals are shifted from one another.

According to the configuration of this aspect, the switching element supplies driving signals to the electrodes configured for ion trapping in a coupled state, and does not supply the driving signals to the electrodes configured for ion trapping in an uncoupled state. A liquid crystal capacitor is constituted by the electrodes configured for ion trapping and the common electrode opposing each other with the liquid crystal layer interposed between those electrodes, and thus even in an uncoupled state, the potentials of those electrodes are maintained at the potential imparted by the driving signals during the coupled state. The potential of the common signal varies between the first potential and the second potential in the first period. Accordingly, when a coupled state in which the driving signals are coupled to the electrodes configured for ion trapping, and an uncoupled state in which the driving signals are not coupled to the electrodes configured for ion trapping, occur in units of durations equal to or less than ½ of the first period, the voltage range of an AC signal that varies between a positive-polarity potential and a negative-polarity potential, taking the potential of the common signal as a reference, can be reduced as compared to a case of a continually-coupled state, i.e., a case where the driving signals are input to the electrodes without providing a switching element. Thus even when a common inversion driving method is employed, AC signals that, taking the potential of the common signal as a reference, vary between a positive-polarity potential and a negative-polarity potential in a second period being longer than the first period, in a state where the phases of the AC signals are shifted from each other, can be applied to the at least three electrodes configured for ion trapping, in a state where the voltage range of the AC signals is constrained to a set range. In other words, it is possible to provide a liquid crystal device that, based on a common inversion driving method, produces an electrical field among the at least three electrodes configured for ion trapping by the AC signals, which attracts ionic impurities in the liquid crystal layer to outside of the display region. This suppresses the occurrence of display unevenness due to ionic impurities and makes low-power-consumption driving possible, and furthermore makes it possible to suppress a rise in the breakdown voltage of the driving circuit that generates the driving signals.

A liquid crystal device according to another aspect of the present disclosure includes, a first substrate in which a plurality of pixel electrodes are arranged in a display region, a second substrate in which a common electrode is disposed throughout the display region, the common electrode being supplied with a common signal potential varying between a first potential and a second potential, which is lower than the first potential, in a first period, a liquid crystal layer held between the first substrate and the second substrate opposing mutually with a sealant interposed therebetween, at least three electrodes configured for ion trapping, the at least three electrodes being disposed at intervals from one another and between the display region of the first substrate and the sealant, a switching element coupled to each of the at least three electrodes, and a holding capacitor coupled between each of the at least three electrodes and a wiring line, to which a potential of the common signal is supplied. A driving signal varying between a third potential and a fourth potential lower than the third potential is input to the switching element, in units of durations equal to or less than ½ of the first period, and AC signals varying between a positive-polarity potential and a negative-polarity potential, with a potential of the common signal being a reference, in a second period, which is longer than the first period, are applied to the at least three electrodes in a state where phases of the AC signals are shifted from one another.

According to the configuration of this aspect, the switching element supplies driving signals to the electrodes configured for ion trapping in a coupled state, and does not supply the driving signals to the electrodes configured for ion trapping in an uncoupled state. A holding capacitor is coupled to the electrodes, and thus even in an uncoupled state, the potentials of those electrodes are maintained at the potential imparted by the driving signals during the coupled state. The potential of the common signal varies between the first potential and the second potential in the first period. Accordingly, when a coupled state in which the driving signals are coupled to the electrodes configured for ion trapping, and an uncoupled state in which the driving signals are not coupled to the electrodes configured for ion trapping, occur in units of durations equal to or less than ½ of the first period, the voltage range of an AC signal that varies between a positive-polarity potential and a negative-polarity potential, taking the potential of the common signal as a reference, can be reduced as compared to a case of a continually-coupled state, i.e., a case where the driving signals are input to the electrodes without providing a switching element or a holding capacitor. Thus even when a common inversion driving method is employed, AC signals that, taking the potential of the common signal as a reference, vary between a positive-polarity potential and a negative-polarity potential in a second period being longer than the first period, in a state where the phases of the AC signals are shifted from each other, can be applied to the at least three electrodes configured for ion trapping, in a state where the voltage range of the AC signals is constrained to a set range. In other words, it is possible to provide a liquid crystal device that, based on a common inversion driving method, produces an electrical field among the at least three electrodes configured for ion trapping by the AC signals, which attracts ionic impurities in the liquid crystal layer to outside of the display region. This suppresses the occurrence of display unevenness due to ionic impurities and makes low-power-consumption driving possible, and furthermore makes it possible to suppress a rise in the breakdown voltage of the driving circuit that generates the driving signals.

Additionally, because the common electrode does not oppose the at least three electrodes with the liquid crystal layer interposed between the electrodes, the ionic impurity sweeping effect of the at least three electrodes configured for ion trapping is less likely to be affected by the potential of the common signal supplied to the common electrode. In other words ionic impurities can be smoothly swept from the display region to the outside.

In the above-described liquid crystal device, the switching element is in a coupled state in all or part of a first duration in which the common signal is at the first potential and the AC signals are at a negative-polarity potential, or a second period in which the common signal is at the second potential and the AC signals are at a positive-polarity potential, the switching element being in an uncoupled state in a duration other than the first duration, when the common signal is in the first duration and the switching element is in a coupled state, the driving signal is at the fourth potential, and when the common signal is in the second duration and the switching element is in the coupled state, the driving signal is at the third potential.

According to this configuration, the potential supplied to the electrodes configured for ion trapping can be controlled by the driving signal in units of durations equal to ½ the first period. In other words, taking the potential of the common signal as a reference, the duration in which the potential of the AC signal applied to the electrodes has a positive polarity, the duration in which the potential has a negative polarity, and the like can be controlled.

The above-described liquid crystal device preferably further includes three electrodes for ion trapping, an average of the second periods of the AC signal is preferably an integral multiple (n times) of 6 of the first period of the common signal, and the AC signals applied to the three electrodes repeat a period of n×(6+1) and a period of n×(6−1).

According to this configuration, in each of the three electrodes, bias in the polarity of the potential can be eliminated by equalizing the durations in which the potential by the AC signal has a positive polarity and the durations in which the potential has a negative polarity. Eliminating bias in the polarity of the potential in each of the three electrodes configured for ion trapping makes it possible to sweep ionic impurities from the display region toward the outside without ionic impurities attracted by the electrodes being left behind.

In the above-described liquid crystal device, a frequency of the common signal is preferably from 60 Hz to 240 Hz, and a frequency of the AC signal is preferably from 0.1 mHz to 5 mHz.

The movement speed of the ionic impurities moved by an electrical field produced among the at least three electrodes depends on the mobility of the ionic impurities. According to this configuration, the frequency of the common signal is from 60 Hz to 240 Hz and the frequency of the AC signal is from 0.1 mHz to 5 mHz, and thus even ionic impurities having small mobility can be swept outside of the display region. Note that when the frequency of the common signal is 60 Hz, the first period is 16.7 ms (milliseconds), and when the frequency of the common signal is 240 Hz, the first period is 4.2 ms (milliseconds). On the other hand, when the frequency of the AC signal is 0.1 mHz, the second period is 10000 seconds, and when the frequency of the AC signal is 5 mHz, the second period is 200 seconds.

In the above-described liquid crystal device, the at least three electrodes are preferably disposed surrounding the display region in the first substrate.

The movement direction of the ionic impurities in the liquid crystal layer is affected by the alignment direction of the liquid crystal molecules in the liquid crystal layer. According to this configuration, the at least three electrodes configured for ion trapping are provided surrounding the display region, and thus ionic impurities can be swept outside the display region regardless of the alignment direction of the liquid crystal molecules in the liquid crystal layer.

A driving method for a liquid crystal device according to an aspect of the present disclosure is a driving method for a liquid crystal device including an electro-optical material held between a pair of substrates opposing mutually with a sealant interposed therebetween, the liquid crystal device including, a pixel electrode disposed in a display region of the liquid crystal device, a common electrode disposed opposing the pixel electrode, and a first electrode, a second electrode, and a third electrode disposed between the sealant and the display region at different intervals from the display region. The driving method includes, supplying, to the common electrode, a common signal varying between a first potential and a second potential, which is lower than the first potential, in a first period, supplying, to the first electrode, a first AC signal varying in a second period different from the first period, supplying, to the second electrode, a second AC signal having a phase different from the first AC signal, and supplying, to the third electrode, a third AC signal having a phase different from those of the first AC signal and the second AC signal.

According to the driving method of this aspect, the common electrode, to which is supplied the common signal that varies between the first potential and the second potential being lower than the first potential in the first period, is included, and thus common inversion driving can be carried out, which makes it possible to suppress a drop in display quality caused by degradation of the liquid crystal material. Furthermore, AC signals having different phases are supplied to the first electrode, the second electrode, and the third electrode, which makes it possible to sweep ionic impurities in the display region to outside the display region and suppress display unevenness. Additionally, this driving is carried out without providing the first electrode, the second electrode, and the third electrode with switching circuits, and thus the cost can be suppressed.

In the above-described driving method for a liquid crystal device, the second period is preferably longer than the first period.

According to this method, the second period is longer than the first period, and thus common inversion driving can be carried out when AC signals that vary in the second period are supplied to the first electrode, the second electrode, and the third electrode at shifted phases. Additionally, an electrical field can be caused to move from the display region toward a region on the outer side, which makes it possible to sweep ionic impurities from the display region to the region on the outer side.

A driving method for a liquid crystal device according to an aspect of the present disclosure is a driving method for a liquid crystal device including, a first substrate in which a plurality of pixel electrodes are arranged in a display region, a second substrate in which a common electrode is disposed, the common electrode being supplied with a common signal potential varying between a first potential and a second potential, which is lower than the first potential, in a first period, a liquid crystal layer held between the first substrate and the second substrate opposing mutually with a sealant interposed therebetween, at least three electrodes for ion trapping, the at least three electrodes being disposed at intervals from one another and between the display region of the first substrate and the sealant, and moreover opposing the common electrode via the liquid crystal layer, and a switching element coupled to each of the at least three electrodes. The driving method includes, inputting, to the switching element, a driving signal varying between a third potential and a fourth potential, which is lower than the third potential, in units of durations equal to or less than ½ of the first period, and applying, to the at least three electrodes, AC signals varying between a positive-polarity potential and a negative-polarity potential, with a potential of the common signal being a reference, in a second period, which is longer than the first period, in a state where phases of the AC signals are shifted from one another.

According to the driving method of this aspect, the switching element supplies driving signals to the electrodes configured for ion trapping in a coupled state, and does not supply the driving signals to the electrodes configured for ion trapping in an uncoupled state. A liquid crystal capacitor is constituted by the electrodes configured for ion trapping and the common electrode opposing each other with the liquid crystal layer interposed between those electrodes, and thus even in an uncoupled state, the potentials of those electrodes are maintained at the potential imparted by the driving signals during the coupled state. The potential of the common signal varies between the first potential and the second potential in the first period. Accordingly, when a coupled state in which the driving signals are coupled to the electrodes configured for ion trapping, and an uncoupled state, occur in units of durations equal to or less than ½ of the first period, the voltage range of an AC signal that varies between a positive-polarity potential and a negative-polarity potential, taking the potential of the common signal as a reference, can be reduced as compared to a case of a continually-coupled state, i.e., a case where the driving signals are input to the electrodes without providing a switching element. Thus even when a common inversion driving method is employed, AC signals that, taking the potential of the common signal as a reference, vary between a positive-polarity potential and a negative-polarity potential in a second period being longer than the first period, in a state where the phases of the AC signals are shifted from each other, can be applied to the at least three electrodes configured for ion trapping, in a state where the voltage range of the AC signals is constrained to a set range. In other words, it is possible to provide a driving method for a liquid crystal device that, based on a common inversion driving method, produces an electrical field among the at least three electrodes configured for ion trapping by the AC signals, which attracts ionic impurities in the liquid crystal layer to outside of the display region. This suppresses the occurrence of display unevenness due to ionic impurities and makes low-power-consumption driving possible, and furthermore makes it possible to suppress a rise in the breakdown voltage of the driving circuit that generates the driving signals.

A driving method for a liquid crystal device according to another aspect of the present disclosure is a driving method for a liquid crystal device including, a first substrate in which a plurality of pixel electrodes are arranged in a display region, a second substrate in which a common electrode is disposed throughout the display region, the common electrode being supplied with a common signal potential varying between a first potential and a second potential, which is lower than the first potential, in a first period, a liquid crystal layer held between the first substrate and the second substrate opposing mutually with a sealant interposed therebetween, at least three electrodes for ion trapping, the at least three electrodes being disposed at intervals from one another and between the display region of the first substrate and the sealant, a switching element coupled to each of the at least three electrodes, and a holding capacitor coupled between each of the at least three electrodes and a wiring line to which the common signal potential is supplied. The driving method includes, inputting, to the switching element, a driving signal varying between a third potential and a fourth potential, which is lower than the third potential, in units of durations equal to or less than ½ of the first period, and applying, to the at least three electrodes, AC signals varying between a positive-polarity potential and a negative-polarity potential, with a potential of the common signal being a reference, in a second period which is longer than the first period, in a state where phases of the AC signals are shifted from one another.

According to the driving method of this aspect, the switching element supplies driving signals to the electrodes configured for ion trapping in a coupled state, and does not supply the driving signals to the electrodes configured for ion trapping in an uncoupled state. A holding capacitor is coupled to the electrodes configured for ion trapping, and thus even in an uncoupled state, the potentials of those electrodes are maintained at the potential imparted by the driving signals during the coupled state. The potential of the common signal varies between the first potential and the second potential in the first period. Accordingly, when a coupled state in which the driving signals are coupled to the electrodes configured for ion trapping, and an uncoupled state, occur in units of durations equal to or less than ½ of the first period, the voltage range of an AC signal that varies between a positive-polarity potential and a negative-polarity potential, taking the potential of the common signal as a reference, can be reduced as compared to a case of a continually-coupled state, i.e., a case where the driving signals are input to the electrodes without providing a switching element and a holding capacitor. Thus even when a common inversion driving method is employed, AC signals that, taking the potential of the common signal as a reference, vary between a positive-polarity potential and a negative-polarity potential in a second period being longer than the first period, in a state where the phases of the AC signals are shifted from each other, can be applied to the at least three electrodes configured for ion trapping, in a state where the voltage range of the AC signals is constrained to a set range. In other words, it is possible to provide a driving method for a liquid crystal device that, based on a common inversion driving method, produces an electrical field among the at least three electrodes configured for ion trapping by the AC signals, which attracts ionic impurities in the liquid crystal layer to outside of the display region. This suppresses the occurrence of display unevenness due to ionic impurities and makes low-power-consumption driving possible, and furthermore makes it possible to suppress a rise in the breakdown voltage of the driving circuit that generates the driving signals.

In the above-described driving method for a liquid crystal device, the switching element is preferably in a coupled state in all or part of a first duration in which the common signal is at the first potential and the AC signals are at a negative-polarity potential, or a second period in which the common signal is at the second potential and the AC signals are at a positive-polarity potential, the switching element being preferably in an uncoupled state in a duration other than the first duration, and when the common signal is in the first duration and the switching element is in a coupled state, the driving signal is preferably at the fourth potential, and when the common signal is in the second duration and the switching element is in the coupled state, the driving signal is preferably at the third potential.

According to this method, the potential supplied to the electrodes configured for ion trapping can be controlled by the driving signal in units of durations equal to ½ the first period. In other words, taking the potential of the common signal as a reference, the period in which the potential of the AC signal applied to the electrodes configured for ion trapping has a positive polarity, the period in which the potential has a negative polarity, and the like can be controlled.

In the above-described driving method for a liquid crystal device, the liquid crystal device preferably includes three electrodes for ion trapping, an average of the second periods of the AC signal is preferably an integral multiple (n times) of 6 of the first period of the common signal, and the AC signals repeating a period of n×(6+1) and a period of n×(6−1) is preferably applied to the three electrodes.

According to this method, in each of the three electrodes, bias in the polarity of the potential can be eliminated by equalizing the durations in which the potential by the AC signal has a positive polarity and the durations in which the potential has a negative polarity. Eliminating bias in the polarity of the potential in the three electrodes configured for ion trapping makes it possible to sweep ionic impurities from the display region toward the outside without ionic impurities attracted by the electrodes being left behind.

An electronic apparatus according to an aspect of the disclosure includes the above-described liquid crystal device.

According to this configuration, an electronic apparatus including a liquid crystal device that suppresses the occurrence of display unevenness due to ionic impurities and can be driven with low power consumption can be provided.

What is claimed is:

1. A liquid crystal device including an electro-optical material held between a pair of substrates opposing mutually with a sealant interposed therebetween, the liquid crystal device comprising:
   a pixel electrode disposed in a display region of the liquid crystal device;
   a common electrode disposed opposing the pixel electrode;
   a first electrode disposed between the display region and the sealant;
   a second electrode disposed between the first electrode and the sealant; and
   a third electrode disposed between the second electrode and the sealant,
   wherein
   a common signal varying between a first potential and a second potential, which is lower than the first potential, in a first period is supplied to the common electrode,
   a first AC signal varying in a second period, which is different from the first period, is supplied to the first electrode,
   a second AC signal having a phase different from that of the first AC signal is supplied to the second electrode, and
   a third AC signal having a phase different from those of the first AC signal and the second AC signal is supplied to the third electrode.

2. The liquid crystal device according to claim 1, wherein the second period is longer than the first period.

3. An electronic apparatus comprising the liquid crystal device according to claim 1.

4. A liquid crystal device comprising:
   a first substrate in which a plurality of pixel electrodes are arranged in a display region;
   a second substrate in which a common electrode is disposed, the common electrode being supplied with a potential of a common signal varying between a first potential and a second potential, which is lower than the first potential, in a first period;
   a liquid crystal layer held between the first substrate and the second substrate opposing mutually with a sealant interposed therebetween;
   at least three electrodes opposing the common electrode via the liquid crystal layer, the at least three electrodes being disposed between the display region of the first substrate and the sealant at different intervals from the display region; and
   a switching element coupled to each of the at least three electrodes, wherein
   a driving signal varying between a third potential and a fourth potential lower than the third potential is input to the switching element, in a unit of a duration equal to or less than ½ of the first period, and
   AC signals varying between a positive-polarity potential and a negative-polarity potential, with a potential of the common signal being a reference, in a second period, which is longer than the first period, are applied to the at least three electrodes in a state where the phases of the AC signals are shifted from one another.

5. The liquid crystal device according to claim 4, wherein the switching element is in a coupled state in all or part of a first duration in which the common signal is at the first potential and the AC signals are at a negative-polarity potential or a second duration in which the common signal is at the second potential and the AC signals are at a positive-polarity potential, the switching element being in an uncoupled state in a duration other than the first duration,
   when the common signal is in the first duration and the switching element is in a coupled state, the driving signal is at the fourth potential, and when the common signal is in the second duration and the switching element is in the coupled state, the driving signal is at the third potential.

6. The liquid crystal device according to claim 4, wherein an average of the second periods of the AC signal is an integral multiple (n times) of 6 of the first period of the common signal, and
   the AC signals applied to the three electrodes repeat a period of n×(6+1) and a period of n×(6−1).

7. The liquid crystal device according to claim 4, wherein a frequency of the common signal is from 60 Hz to 240 Hz, and a frequency of the AC signal is from 0.1 mHz to 5 mHz.

8. The liquid crystal device according to claim 4, wherein the at least three electrodes are disposed surrounding the display region in the first substrate.

9. A liquid crystal device comprising:
   a first substrate in which a plurality of pixel electrodes are arranged in a display region;
   a second substrate in which a common electrode is disposed throughout the display region, the common electrode being supplied with a potential of a common signal varying between a first potential and a second potential, which is lower than the first potential, in a first period;

a liquid crystal layer held between the first substrate and the second substrate, opposing mutually with a sealant interposed therebetween;

at least three electrodes for ion trapping, the at least three electrodes being disposed at intervals from one another and between the display region of the first substrate and the sealant;

a switching element coupled to each of the at least three electrodes; and a holding capacitor coupled between each of the at least three electrodes and a wiring line to which a potential of the common signal is supplied, wherein a driving signal varying between a third potential and a fourth potential lower than the third potential is input to the switching element, in a unit of a duration equal to or less than ½ of the first period, and AC signals varying between a positive-polarity potential and a negative-polarity potential, with a potential of the common signal being a reference, in a second period, which is longer than the first period, are applied to the at least three electrodes in a state where the phases of the AC signals are shifted from one another.

10. A driving method for a liquid crystal device including an electro-optical material held between a pair of substrates opposing mutually with a sealant interposed therebetween, the liquid crystal device including, a pixel electrode disposed in a display region of the liquid crystal device, a common electrode disposed opposing the pixel electrode, and a first electrode, a second electrode, and a third electrode disposed between the sealant and the display region at different intervals from the display region, the driving method comprising:

supplying, to the common electrode, a common signal varying between a first potential and a second potential, which is lower than the first potential, in a first period;

supplying, to the first electrode, a first AC signal varying in a second period different from the first period;

supplying, to the second electrode, a second AC signal having a phase different from that of the first AC signal; and supplying, to the third electrode, a third AC signal having a phase different from those of the first AC signal and the second AC signal.

11. The driving method for a liquid crystal device according to claim 10, wherein the second period is longer than the first period.

12. A driving method for a liquid crystal device including, a first substrate in which a plurality of pixel electrodes are arranged in a display region, a second substrate in which a common electrode is disposed, the common electrode being supplied with a potential of a common signal varying between a first potential and a second potential, which is lower than the first potential, in a first period, a liquid crystal layer held between the first substrate and the second substrate opposing mutually with a sealant interposed therebetween, at least three electrodes for ion trapping, the at least three electrodes being disposed at intervals from one another and between the display region of the first substrate and the sealant, and opposing the common electrode via the liquid crystal layer, and a switching element coupled to each of the at least three electrodes, the driving method comprising:

inputting, to the switching element, a driving signal varying between a third potential and a fourth potential, which is lower than the third potential, in a unit of a duration equal to or less than ½ of the first period; and applying, to the at least three electrodes, AC signals varying between a positive-polarity potential and a negative-polarity potential, with a potential of the common signal being a reference, in a second period, which is longer than the first period, in a state where phases of the AC signals are shifted from one another.

13. The driving method for a liquid crystal device according to claim 12, wherein the switching element is in a coupled state in all or part of a first duration in which the common signal is at the first potential and the AC signals are at a negative-polarity potential, or a second period in which the common signal is at the second potential and the AC signals are at a positive-polarity potential, the switching element being in an uncoupled state in a duration other than the first duration; and when the common signal is in the first duration and the switching element is in a coupled state, the driving signal is at the fourth potential, and when the common signal is in the second duration and the switching element is in the coupled state, the driving signal is at the third potential.

14. The driving method for a liquid crystal device according to claim 12, wherein the liquid crystal device comprises three electrodes for ion trapping, an average of the second periods of the AC signal is an integral multiple (n times) of 6 of the first period of the common signal; and the AC signals repeating a period of n×(6+1) and a period of n×(6−1) are applied to the three electrodes.

15. A driving method for a liquid crystal device including, a first substrate in which a plurality of pixel electrodes are arranged in a display region, a second substrate in which a common electrode is disposed throughout the display region, the common electrode being supplied with a potential of a common signal varying between a first potential and a second potential, which is lower than the first potential, in a first period, a liquid crystal layer held between the first substrate and the second substrate, opposing mutually with a sealant interposed therebetween, at least three electrodes for ion trapping, the at least three electrodes being disposed at intervals from one another and between the display region of the first substrate and the sealant, a switching element coupled to each of the at least three electrodes, and a holding capacitor coupled between each of the at least three electrodes and a wiring line to which a potential of the common signal is supplied, the driving method comprising:

inputting, to the switching element, a driving signal varying between a third potential and a fourth potential, which is lower than the third potential, in a unit of a duration equal to or less than ½ of the first period; and applying, to the at least three electrodes, AC signals varying between a positive-polarity potential and a negative-polarity potential, with a potential of the common signal being a reference, in a second period, which is longer than the first period, in a state where phases of the AC signals are shifted from one another.

* * * * *